United States Patent
Kakinoki et al.

(10) Patent No.: US 12,141,399 B2
(45) Date of Patent: Nov. 12, 2024

(54) SENSOR MODULE

(71) Applicant: Japan Display Inc., Tokyo (JP)

(72) Inventors: Yuto Kakinoki, Tokyo (JP); Hirofumi Nakagawa, Kanagawa (JP)

(73) Assignee: Japan Display Inc., Tokyo (JP)

( * ) Notice: Subject to any disclaimer, the term of this patent is extended or adjusted under 35 U.S.C. 154(b) by 55 days.

(21) Appl. No.: 18/143,186

(22) Filed: May 4, 2023

(65) Prior Publication Data

US 2023/0384893 A1 Nov. 30, 2023

(30) Foreign Application Priority Data

May 27, 2022 (JP) .................. 2022-086974

(51) Int. Cl.
G06F 3/041 (2006.01)
G06F 3/044 (2006.01)
(52) U.S. Cl.
CPC ........ G06F 3/04186 (2019.05); G06F 3/0443 (2019.05)
(58) Field of Classification Search
None
See application file for complete search history.

(56) References Cited

U.S. PATENT DOCUMENTS

2014/0002177 A1 1/2014 Yoshitaka et al.
2023/0072599 A1* 3/2023 Nakanishi ............. G06F 3/0443

FOREIGN PATENT DOCUMENTS

JP 2014-010603 A 1/2014

* cited by examiner

*Primary Examiner* — Ifedayo B Iluyomade
(74) *Attorney, Agent, or Firm* — K&L Gates LLP

(57) ABSTRACT

Provided is a sensor module including a plurality of sensor electrodes, a plurality of sensor wirings, a plurality of auxiliary electrodes, and a driver circuit. The plurality of sensor electrodes is arranged in a matrix having first to mth rows and first to nth columns. The plurality of sensor wirings is respectively connected to the plurality of sensor electrodes. The plurality of auxiliary electrodes is respectively connected to the plurality of sensor electrodes and extends from the plurality of sensor electrodes in a direction opposite to the direction in which the plurality of sensor wirings extends from the plurality of sensor electrodes. The driver circuit is connected to the plurality of sensor wirings and is configured to obtain sensor values of the plurality of sensor electrodes on the basis of potential fluctuations of the plurality of sensor electrodes.

10 Claims, 19 Drawing Sheets

FIG. 7

|  | 1st col. | (j-1)th col. | jth col. | (j+1)th col. | | nth col. |
|---|---|---|---|---|---|---|
| 1st row | 206 (1,1) | 206 (1,j-1) | 206 (1,j) | 206 (1,j+1) | ... | 206 (1,n) |
| 2nd row | 206 (2,1) | 206 (2,j-1) | 206 (2,j) | 206 (2,j+1) | | 206 (2,n) |
| (i-1)th row | 206 (i-1,1) | 206 (i-1,j-1) | 206 (i-1,j) | 206 (i-1,j+1) | | 206 (i-1,n) |
| ith row | 206 (i,1) | 206 (i,j-1) | 206 (i,j) | 206 (i,j+1) | | 206 (i,n) |
| (i+1)th row | 206 (i+1,1) | 206 (i+1,j-1) | 206 (i+1,j) | 206 (i+1,j+1) | | 206 (i+1,n) |
| mth row | 206 (m,1) | 206 (m,j-1) | 206 (m,j) | 206 (m,j+1) | ... | 206 (m,n) |

Second Correction Process

SENSOR MODULE

CROSS-REFERENCE TO RELATED APPLICATIONS

This application claims the benefit of priority to Japanese Patent Application No. 2022-086974, filed on May 27, 2022, the entire contents of which are incorporated herein by reference.

FIELD

An embodiment of the present invention relates to a sensor module and a display device equipped with the sensor module. For example, an embodiment of the present invention relates to a non-contact type sensor module and a display device equipped with the non-contact type sensor module.

BACKGROUND

Electrostatic capacitive sensor modules have been widely used as one of the interfaces for inputting information to information terminals. In a sensor module, when an input means approaches a plurality of sensor electrodes arranged in a matrix, a virtual capacitance element is formed between the sensor electrodes and the input means and between the wirings connected to the sensor electrodes and the input means, resulting in a fluctuation in the potential of the sensor electrodes. The input position can be accurately identified by appropriately eliminating the potential fluctuation of the sensor electrodes caused by the latter capacitance element (see, for example, Japanese Patent Application Publication No. 2014-10603).

SUMMARY

An embodiment of the present invention is a sensor module configured to identify a position of an input means. The sensor module includes a plurality of sensor electrodes, a plurality of sensor wirings, a plurality of auxiliary wirings, and a driver circuit. The plurality of sensor electrodes is arranged in a matrix form having first to mth rows and first to nth columns. The plurality of sensor wirings is respectively connected to the plurality of sensor electrodes. The plurality of auxiliary wirings is respectively connected to the plurality of sensor electrodes and extends from the plurality of sensor electrodes in a direction opposite to a direction in which the plurality of sensor wirings extends from the plurality of sensor electrodes. The driver circuit is connected to the plurality of sensor wirings and is configured to obtain sensor values of the plurality of sensor electrodes on the basis of fluctuations of the plurality of sensor electrodes. At least a part of the plurality of sensor wirings connected to the plurality of sensor electrodes arranged in one of two adjacent columns and at least a part of the plurality of auxiliary wirings connected to the plurality of sensor electrodes arranged in the other column are arranged between the two columns. The driver circuit is configured to identify the position of the input means utilizing the sensor values and perform a correction process to eliminate, in identifying the position of the input means, at least one of an influence of an electrostatic capacitance formed by the input means and a part of the plurality of sensor wirings and an influence of an electrostatic capacitance formed by the input means and a part of the auxiliary wirings. m and n are each a constant independently selected from natural numbers equal to or larger than 3.

An embodiment of the present invention is a display device. The display device includes an array substrate with a display module including a plurality of pixels and a sensor module over the display module. The sensor module includes a plurality of sensor electrodes, a plurality of sensor wirings, a plurality of auxiliary wirings, and a driver circuit. The plurality of sensor electrodes is arranged in a matrix form having first to mth rows and first to nth columns. The plurality of sensor wirings is respectively connected to the plurality of sensor electrodes. The plurality of auxiliary wirings is respectively connected to the plurality of sensor electrodes and extends from the plurality of sensor electrodes in a direction opposite to a direction in which the plurality of sensor wirings extends from the plurality of sensor electrodes. The driver circuit is connected to the plurality of sensor wirings and is configured to obtain sensor values of the plurality of sensor electrodes on the basis of fluctuations of the plurality of sensor electrodes. At least a part of the plurality of sensor wirings connected to the plurality of sensor electrodes arranged in one of two adjacent columns and at least a part of the plurality of auxiliary wirings connected to the plurality of sensor electrodes arranged in the other column are arranged between the two columns. The driver circuit is configured to identify the position of the input means utilizing the sensor values and perform a correction process to eliminate, in identifying the position of the input means, at least one of an influence of an electrostatic capacitance formed by the input means and a part of the plurality of sensor wirings and an influence of an electrostatic capacitance formed by the input means and a part of the auxiliary wirings. m and n are each a constant independently selected from natural numbers equal to or larger than 3.

An embodiment of the present invention is a correction method of a sensor module. The sensor module includes a plurality of sensor electrodes, a plurality of sensor wirings, a plurality of auxiliary wirings, and a driver circuit. The plurality of sensor electrodes is arranged in a matrix form having first to mth rows and first to nth columns. The plurality of sensor wirings is respectively connected to the plurality of sensor electrodes. The plurality of auxiliary wirings is respectively connected to the plurality of sensor electrodes and extends from the plurality of sensor electrodes in a direction opposite to a direction in which the plurality of sensor wirings extends from the plurality of sensor electrodes. The driver circuit is connected to the plurality of sensor wirings and is configured to obtain sensor values of the plurality of sensor electrodes on a basis of fluctuations of the plurality of sensor electrodes. At least a part of the plurality of sensor wirings connected to the plurality of sensor electrodes arranged in one of two adjacent columns and at least a part of the plurality of auxiliary wirings connected to the plurality of sensor electrodes arranged in the other column are arranged between the two columns. The correction method includes eliminating, in identifying the position of the input means, at least one of an influence of an electrostatic capacitance formed by the input means and a part of the plurality of sensor wirings and an influence of an electrostatic capacitance formed by the input means and a part of the auxiliary wirings. m and n are each a constant independently selected from natural numbers equal to or larger than 3.

BRIEF DESCRIPTION OF DRAWINGS

FIG. 7 is a schematic view for explaining an arrangement of sensor electrodes of a sensor module according to an embodiment of the present invention.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

In the embodiments of the present invention, when a plurality of films is formed with the same process at the same time, these films have the same layer structure, the same material, and the same composition. Hence, the plurality of films is defined as existing in the same layer.

Hereinafter, a sensor module 200 and a display device 100 equipped with the sensor module 200 according to an embodiment of the present invention are explained.

1. Display Device

Figure 1:
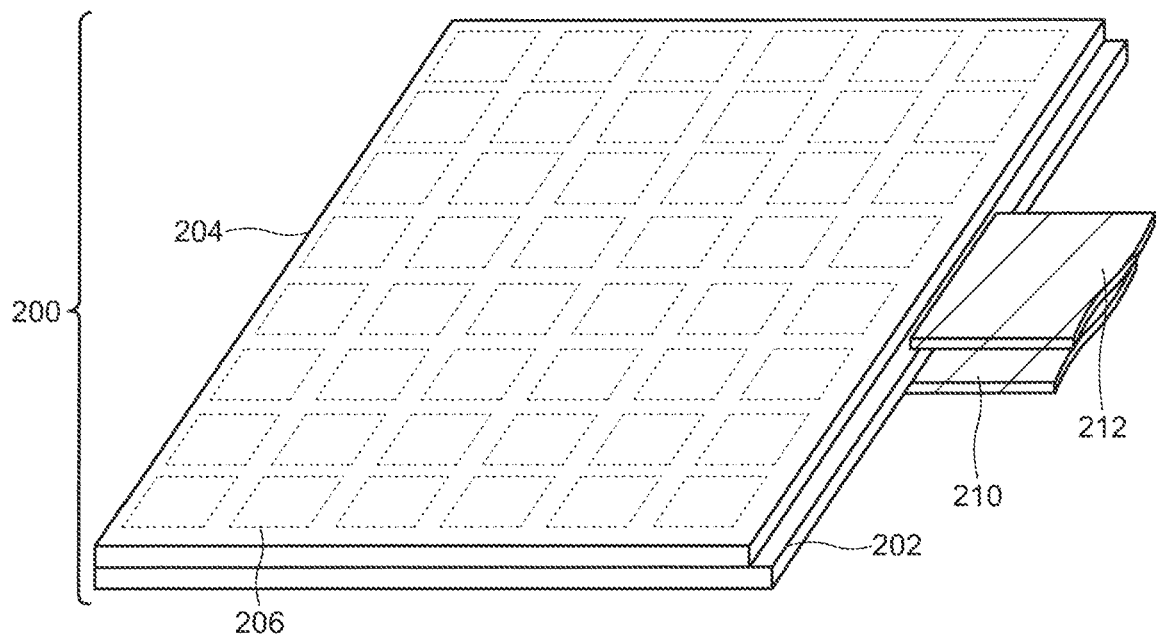
FIG. 1 is a schematic developed view of a display device according to an embodiment of the present invention.
Figure 1:
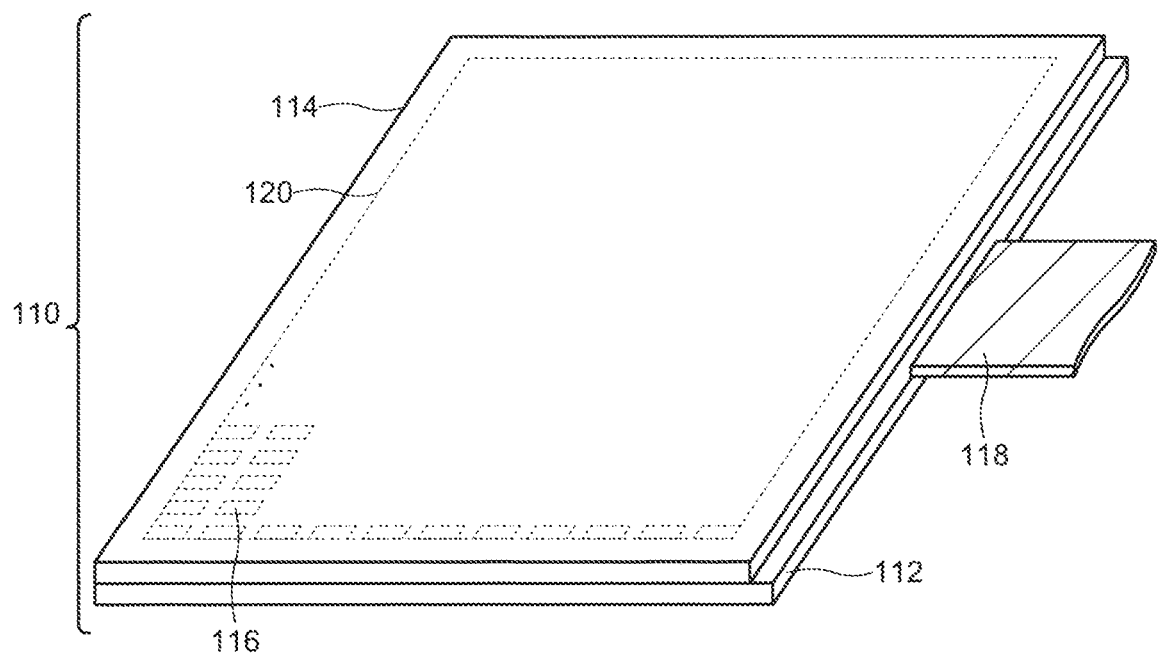

A schematic developed view of the display device 100 is shown in FIG. 1. The display device 100 includes a display module 110 and a sensor module 200 arranged over the display module 110. The display module 110 and sensor module 200 are fixed to each other with an adhesive layer which is not illustrated in FIG. 1.

2. Display Module

The display module 110 is a device that has a function of displaying images and includes, as its fundamental components, an array substrate 112, a plurality of pixels 116 formed over the array substrate 112, and a counter substrate 114 over the array substrate 112. An area surrounding the plurality of pixels 116 is called a display area 120. Each pixel 116 has a display element and functions as the minimum unit providing color information. As the display element, an electroluminescence device exemplified by an organic light-emitting device (OLED) and the like can be used as well as a liquid crystal device. When a liquid crystal element is used, the display module 110 is further provided with a light source (backlight) which is not illustrated. Each pixel 116 operates according to a power source and video signals supplied via a connector 118 such as a flexible printed circuit (FPC) board to provide light of a specific color in a gradation based on the video signals. Images can be displayed on the display area 120 by controlling the operation of the pixels 116 on the basis of the video signals.

There are no restrictions on the size of the display module 110, and the size may be a size used for portable communication terminals called 12.1 inch (31 cm) size, a size suitable for monitors, televisions, signage, and so on connected to computers (for example, 14.1 inch (36 cm) size to 32 inch (81 cm) size), or even a larger size, for example.

3. Sensor Module

The sensor module 200 is a device transmitting light from the display module 110 and serving as an interface for inputting information to the display device 100. The sensor module 200 is a contact or non-contact type sensor module and has a function to detect an input means and identify the position of the input means (hereinafter, simply referred to as an input position) over the sensor module 200 not only when the input means such as a finger, palm, or stylus with a plastic tip directly contacts the sensor module 200 but also when the input means does not contact the sensor module 200 but is in the vicinity (for example, within 5 mm, 20 mm, 50 mm, or 100 mm from the outermost surface of the sensor module 200; the detection range can be set as appropriate). Hereinafter, each component of the sensor module 200 is explained.

3-1. Sensor Substrate and Cover Substrate

As shown in FIG. 1 and a schematic top view (FIG. 2), the sensor module 200 has a sensor substrate 202 and a cover substrate 204 facing the sensor substrate 202. The sensor substrate 202 and the cover substrate 204 are composed of a material transmitting visible light in order to allow the image displayed by the display module 110 to be viewed. For this purpose, the sensor substrate 202 and the cover substrate 204 are composed of glass, quartz, and a polymer material such as a polyimide, a polyamide, and a polycarbonate.

3-2. Sensor Electrode

A plurality of sensor electrodes 206 is provided between the sensor substrate 202 and the cover substrate 204. An area surrounding all of the sensor electrodes 206 is called a sensor area 208. The plurality of sensor electrodes 206 is arranged in a matrix form having first to mth rows and first to nth columns. In the example shown in FIG. 2, 60 sensor electrodes 206 arranged in a matrix of 6 rows and 10 columns are provided in the sensor module 200. The number (i.e., m and n) and the size of the sensor electrodes 206 can be set appropriately according to the size of the display device 100 and the detection accuracy required for the sensor module 200.

Figure 2:
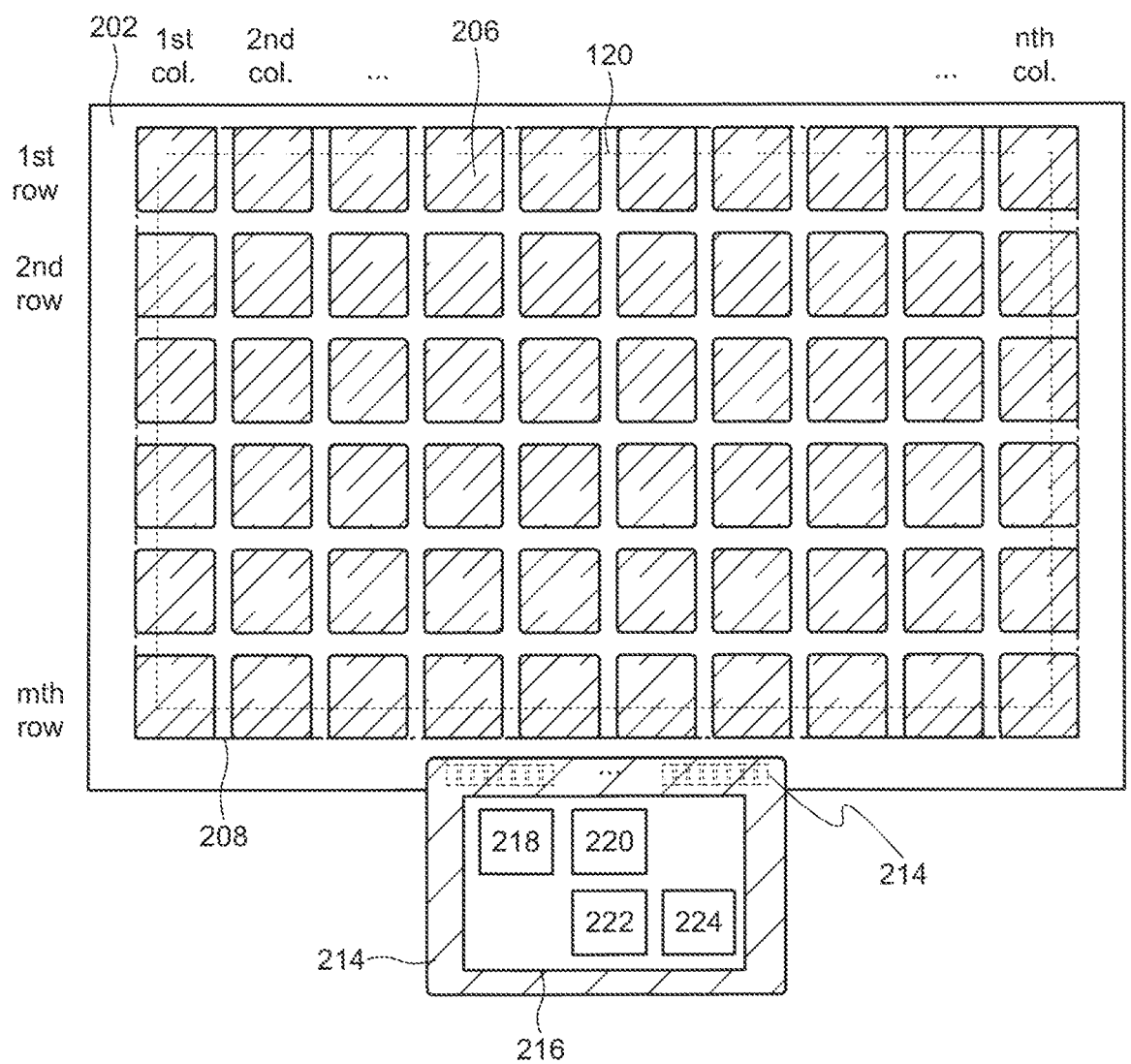
FIG. 2 is a schematic top view of a sensor module according to an embodiment of the present invention.

In the following explanation, the row farthest from terminals 214 is defined as the first row, and the row on the terminal 214 side is defined as the mth row as shown in FIG. 2. When the terminals 214 are placed on the bottom side, the leftmost column is defined as the first column, while the rightmost column is defined as the nth column.

Moreover, the sensor electrodes 206 are arranged so that the sensor area 208 shown by the chain line overlaps the whole of the display area 120 shown by the dotted line. Although not illustrated, the sensor area 208 and the display area 120 may have the same shape. Alternatively, the sensor area 208 may be smaller than the display area 120. In this case, the sensor electrodes 206 are arranged so that the entire sensor area 208 overlaps the display area 120.

3-3. Sensor Wiring and Auxiliary Wiring

As shown in a schematic top view of a portion of the sensor module 200 (FIG. 3), each sensor electrode 206 is connected to the corresponding sensor wiring 230. That is, the sensor module 200 is provided with the same number of sensor wirings 230 as the sensor electrodes 206, and one sensor wiring 230 is electrically connected to one sensor electrode 206. Each sensor wiring 230 extends from the sensor electrode 206 connected thereto to the terminal 214 side of the sensor substrate 202 and forms the terminal 214 (see FIG. 2) at the end portion.

Furthermore, in the sensor module 200, a plurality of auxiliary wirings 232 is respectively connected to the plurality of sensor electrodes 206. One auxiliary wiring 232 is connected to one sensor electrode 206 and extends in the opposite direction to the direction in which the sensor wiring 230 extends, i.e., in the opposite direction to the terminal 214. Preferably, each auxiliary wiring 232 extends outside of the sensor area 208. The auxiliary wiring 232 is not connected to any other conductive components, except for the sensor electrode 206 connected thereto. Therefore, this sensor electrode 206 and the sensor wiring 230 and auxiliary wiring 232 connected thereto are always electrically equipotential.

Figure 3:
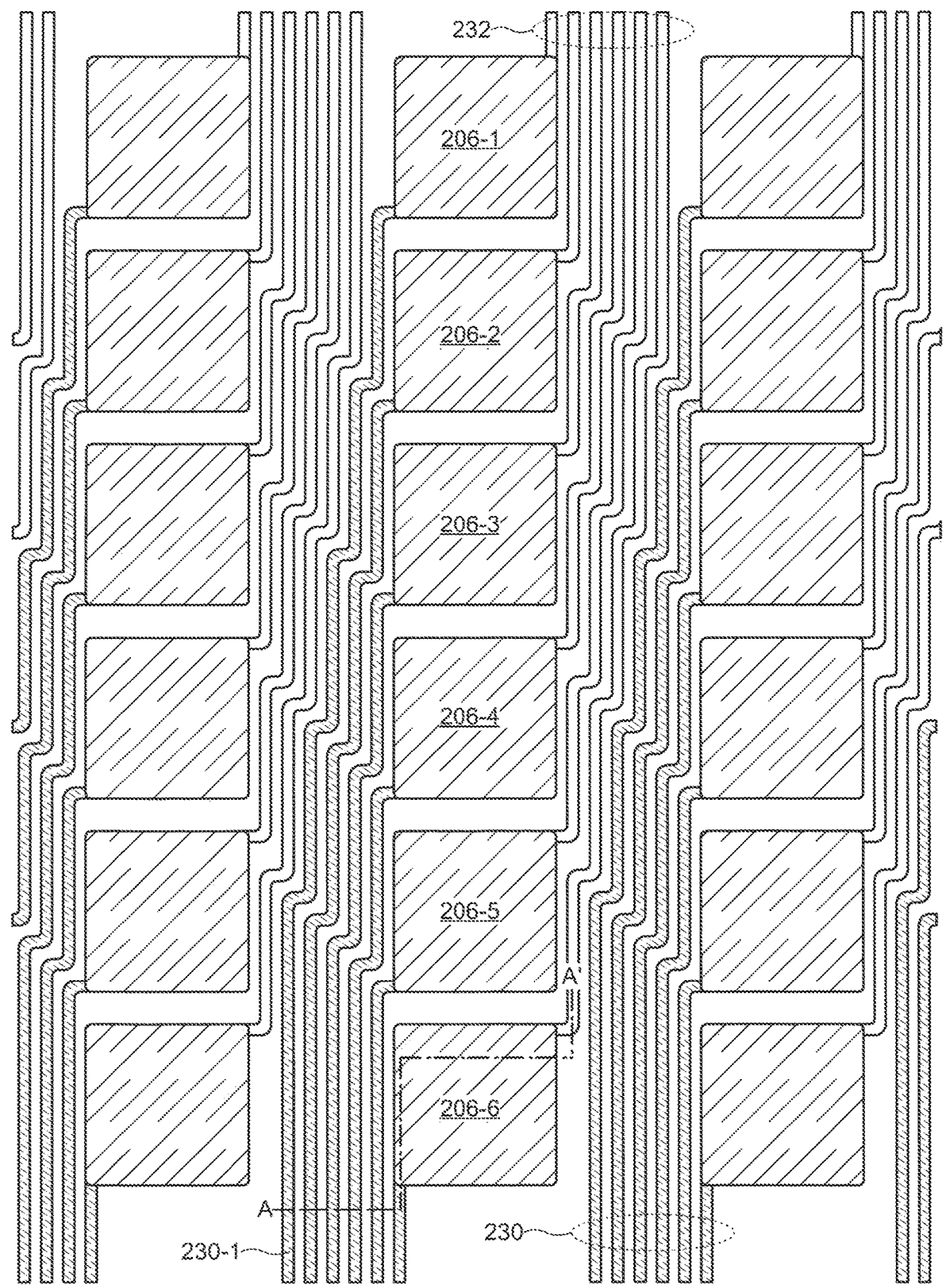
FIG. 3 is a schematic top view of a sensor module according to an embodiment of the present invention.

As can be understood from FIG. 3, the sensor wiring 230 and the auxiliary wiring 232 connected to each sensor electrode 206 are located on opposite sides to each other with the sensor electrode 206 as the center. When focus is placed on two adjacent columns, the plurality of sensor wirings 230 connected to the sensor electrodes 206 arranged in one column and the plurality of auxiliary wirings 232 connected to the sensor electrodes 206 arranged in the other column are arranged between these two columns.

3-4. Driver Circuit

A first connector 212 such as a flexible printed circuit (FPC) board is electrically connected to the sensor wirings 230 via the terminals 214, and a driver circuit 216 is connected to the first connector 212 (FIG. 1 and FIG. 2). Hence, the sensor electrodes 206 and the auxiliary wirings 232 are electrically connected to the driver circuit 216 via the sensor wirings 230. The driver circuit 216 may be mounted on the first connector 212 or on a printed circuit board which is not illustrated.

The driver circuit 216 is structured by, for example, a power circuit 218, a detector 220, a computing element 222, an interface 224, and the like. The power circuit 218 converts an externally supplied power source into a pulsed AC voltage (AC square wave) and supplies this AC voltage to each sensor electrode 206 via the terminal 214 and the sensor wiring 230. The detector 220 is also called an analog front end (AFE: Analog Front End), detects changes in the capacitance of the sensor electrodes 206 as a potential fluctuation, and digitizes the potential fluctuation to convert them into detection signals. The detection signals generated by the detector 220 are input to the computing element 222, and the sensor values, which are an indicator of the potential fluctuation of each sensor electrode 206, are obtained on the basis of this detection signal. The coordinates representing the input position are determined by the sensor values. The detector 220 and the computing element 222 may be configured as a single integrated circuit (IC) chip. The interface 224 is used to connect to external circuits and is configured on the basis of a standard such as Universal Serial Bus (USB), Serial Peripheral Interface (SPI), or the like.

As described above, a pulsed AC voltage is applied to the sensor electrodes 206 via the sensor wirings 230. When the input means approaches the sensor electrodes 206, a virtual capacitive element is formed between the input means and the sensor electrodes 206, resulting in a fluctuation in potential of each sensor electrode 206. This potential fluctuation is detected and digitally converted by the detector 220, and the coordinates of the input position are identified on the basis of the sensor value of each sensor electrode 206 in the computing element 222. Thus, the sensor module 200 functions as an electrostatic capacitive (self-capacitive) contact or non-contact type sensor (hover sensor).

As can be understood from FIG. 3, each sensor wiring 230 does not overlap with other sensor electrodes 206 except for the connection portion for the electrical connection with the sensor electrode 206 connected to that sensor wiring 230. In other words, each sensor wiring 230 is exposed from the sensor electrodes 206 except for the aforementioned connection portion. This feature reduces the capacitance (parasitic capacitance) between the sensor wirings 230 and the sensor electrodes 206. Therefore, even when the input means approaches a certain sensor electrode 206 and the potential of the sensor wiring 230 connected thereto fluctuates, this potential fluctuation has no significant influence on other sensor electrodes 206. As a result, the detection signal of that sensor electrode 206 is not dispersed to other sensor electrodes 206, and the position of the input can be accurately identified.

Similar to the sensor wirings 230, each auxiliary wiring 232 is also arranged so as not to overlap all of the sensor electrodes 206 except for the connection portion for the electrical connection with the sensor electrode 206 connected thereto. The summation of the areas of each sensor electrode 206 and the sensor wiring 230 and auxiliary wiring 232 connected thereto are the same or almost the same in the sensor area by providing the auxiliary wirings. Therefore, the capacitance difference between the sensor electrodes due to the difference in the length of the sensor wiring is eliminated, and if the distance between the input means and the sensor module 200 is constant, a constant electrostatic capacitance can be generated regardless of the input position.

In addition, since the density of wirings, i.e., the summation of the areas of the sensor wirings 230 and auxiliary wirings 232 is almost constant in the column direction, the coordinates of the input means can be accurately identified. For example, when the input means approaches the sensor electrode 206-6 in the sixth row near the terminals 214, the largest potential fluctuation occurs at the sensor electrode 206-6 in the sixth row closest to the coordinates thereof, and a secondary potential fluctuation may occur at the sensor wirings 230 arranged close to the sensor electrode 206-6 and other sensor electrodes 206 connected thereto. Similarly, even when the input means approaches the sensor electrode 206-1 in the first row away from the terminals 214, the largest potential fluctuation may occur at the sensor electrode 206-1 closest to the coordinates thereof, and a secondary potential fluctuation may also occur at the sensor electrodes 206 in the second to sixth rows because a secondary potential fluctuation may also occur at the auxiliary wirings 232 connected to the sensor electrodes 206 in the second to sixth rows. That is, it is possible to not only detect the large potential fluctuation at the sensor electrode 206 proximate to the input means but also cause almost the same secondary potential fluctuations at other sensor electrodes 206 in the column in which that sensor electrode 206 is arranged, without depending on the coordinates of the input means. As a result, the dependence of the secondary potential fluctuation on the coordinates of the input means, especially the coordinate dependence in the column direction, is eliminated, and the coordinates of the input means can be accurately identified.

3-5. Cross-Sectional Structure

Figure 4:
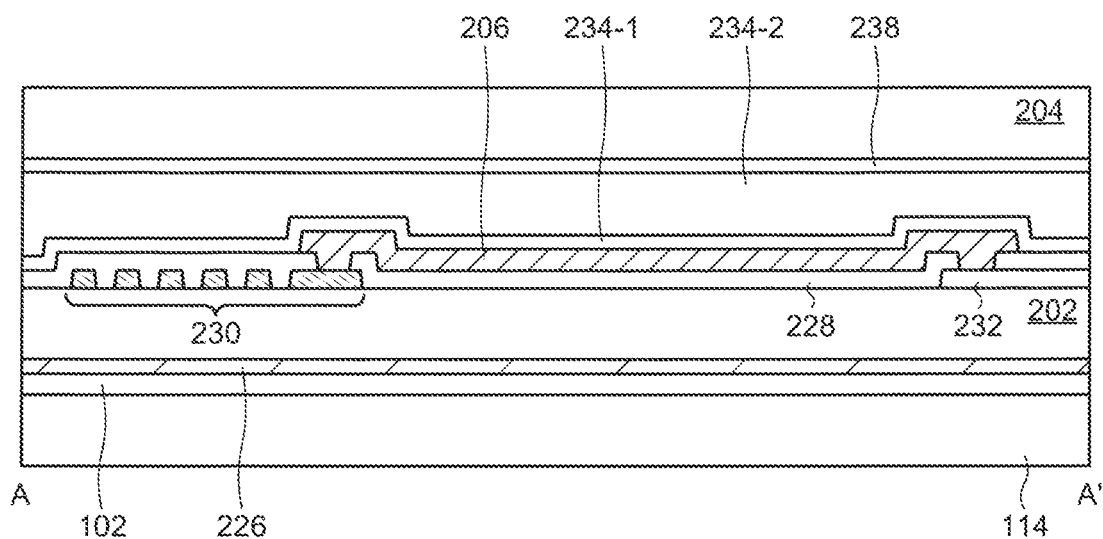
FIG. 4 is a schematic cross-sectional view of a sensor module according to an embodiment of the present invention.

FIG. 4 shows a schematic view of a cross section along the chain line A-A' in FIG. 3. FIG. 4 also shows the counter substrate 114 of the display module 110. As shown in FIG. 4, the display module 110 and the sensor module 200 are fixed to each other by an adhesive layer 102 transmitting visible light. When the display module 110 is a liquid crystal display device, a polarizing plate and the like is provided over the counter substrate 114.

A noise shield layer 226 may be provided between the sensor substrate 202 and the counter substrate 114 to shield electrical influences from the display module 110. The noise shield layer 226 may be provided over or under the adhesive layer 102. The noise shield layer 226 includes a light-transmitting oxide having conductivity, such as indium-tin oxide (ITO) and indium-zinc oxide (IZO), or a metal. In the latter case, a mesh-shaped metal film with a plurality of openings may be used as the noise shield layer 226 to allow transmission of visible light. The noise shield layer 226 is provided to overlap the plurality of sensor electrodes 206. A second connector 210 such as an FPC board is electrically connected to the noise shield layer 226 (see FIG. 1) and is applied with a pulsed AC voltage in the same phase as the potential applied to the sensor electrodes 206. Therefore, the noise shield layer 226 is always equipotential with the sensor electrodes 206.

Figure 5:
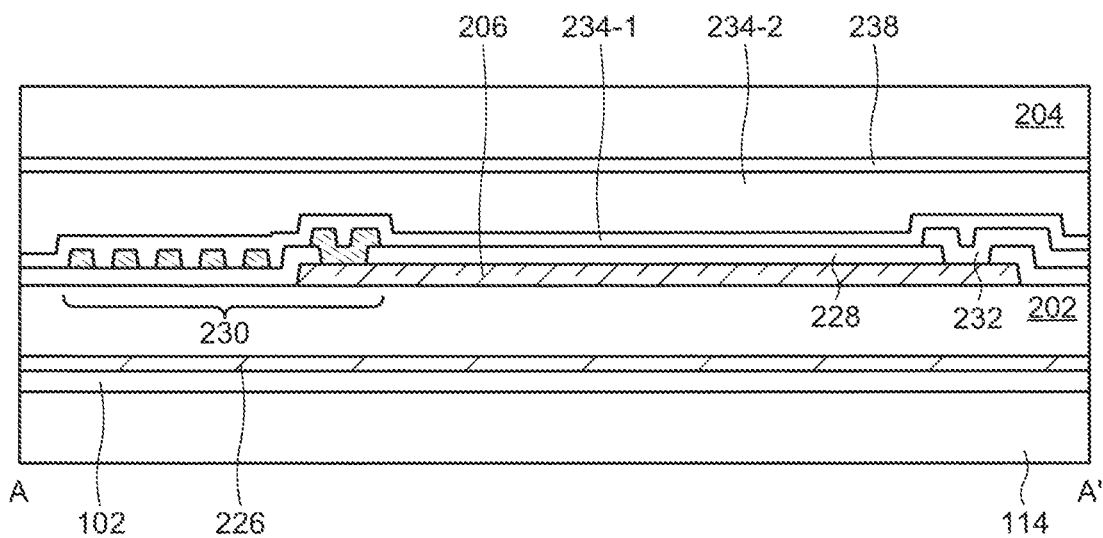
FIG. 5 is a schematic cross-sectional view of a sensor module according to an embodiment of the present invention.
Figure 6:
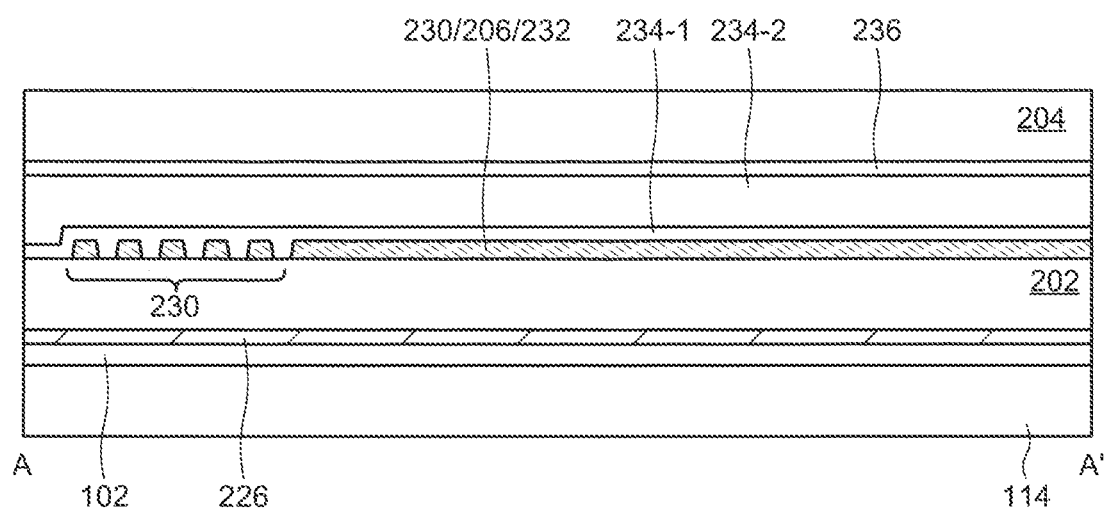
FIG. 6 is a schematic cross-sectional view of a sensor module according to an embodiment of the present invention.

The sensor wirings 230 and the auxiliary wirings 232 are provided over the sensor substrate 202 directly or through an insulating undercoat which is not illustrated, over which the sensor electrodes 206 are arranged. At this time, the sensor electrodes 206 may be provided directly over the undercoat. Alternatively, an interlayer insulating film 228 containing a silicon-containing inorganic compound such as silicon oxide and silicon nitride may be provided to cover the sensor wirings 230 and auxiliary wirings 232, and the sensor electrodes 206 may be disposed over the interlayer insulating film 228 as shown in FIG. 4. In the latter case, the sensor electrodes 206 are electrically connected to the sensor wirings 230 and the auxiliary wirings 232 through openings formed in the interlayer insulating film 228. Note that there is no restriction on the vertical relationship between the sensor electrodes 206 and the auxiliary wirings 232, and the interlayer insulating film 228 may be provided over the sensor electrodes 206 over which the sensor wirings 230 and auxiliary wirings 232 may be arranged as shown in FIG. 5. Alternatively, as shown in FIG. 6, the sensor electrodes 206, the sensor wirings 230, and the auxiliary wirings 232 may be provided in the same layer. Namely, the sensor electrodes 206, the sensor wirings 230, and the auxiliary wirings 232 having the same composition may be formed simultaneously in the same process.

The sensor electrodes 206, the sensor wirings 230, and the auxiliary wirings 232 are each configured to include a conductive oxide transmitting visible light, such as ITO and IZO, or a metal (0-valent metal) such as molybdenum, tungsten, tantalum, aluminum, and copper. The sensor electrodes 206, the sensor wirings 230, and the auxiliary wirings 232 may each have a single-layer structure or a multi-layer structure. For example, the sensor electrodes 206, the sensor wirings 230, and the auxiliary wirings 232 may each have a structure in which a layer containing a conductive oxide and a layer containing a metal are stacked. When 0-valent metal is included, the sensor electrodes 206, the sensor wirings 230, and the auxiliary wirings 232 may be formed as a mesh to ensure a light-transmitting property.

A protective film 234 may be provided on the sensor wirings 230 and the sensor electrodes 206. The protective film 234 has a single-layer or multi-layer structure and is composed of a film containing a silicon-containing inorganic compound or a resin such as an epoxy resin, an acrylic resin, and a silicone resin. In FIG. 4 to FIG. 6, a protective film 234 is demonstrated in which a first protective film 234-1 containing an inorganic compound and a second protective film 234-2 containing a resin are stacked. There is no restriction on the stacking order of the first protective film 234-1 and the second protective film 234-2, and the first protective film 234-1 may be stacked over the second protective film 234-2. The first protective film 234-1 containing a resin also functions as a planarization film. The cover substrate 204 is fixed over the protective film 234 via an adhesive layer 236 transmitting visible light.

4. Correction Method in Sensor Module

Hereinafter, the correction method for accurately identifying the input position in the sensor module 200 is explained. In the following explanation, i and j are used as variables for identifying the sensor electrode 206. i is a natural number selected from 1 to m, and j is a natural number selected from 1 to n. As shown in FIG. 7, the sensor electrode 206 located in the ith row and jth column is denoted as a sensor electrode 206($i, j$).

Figure 8:
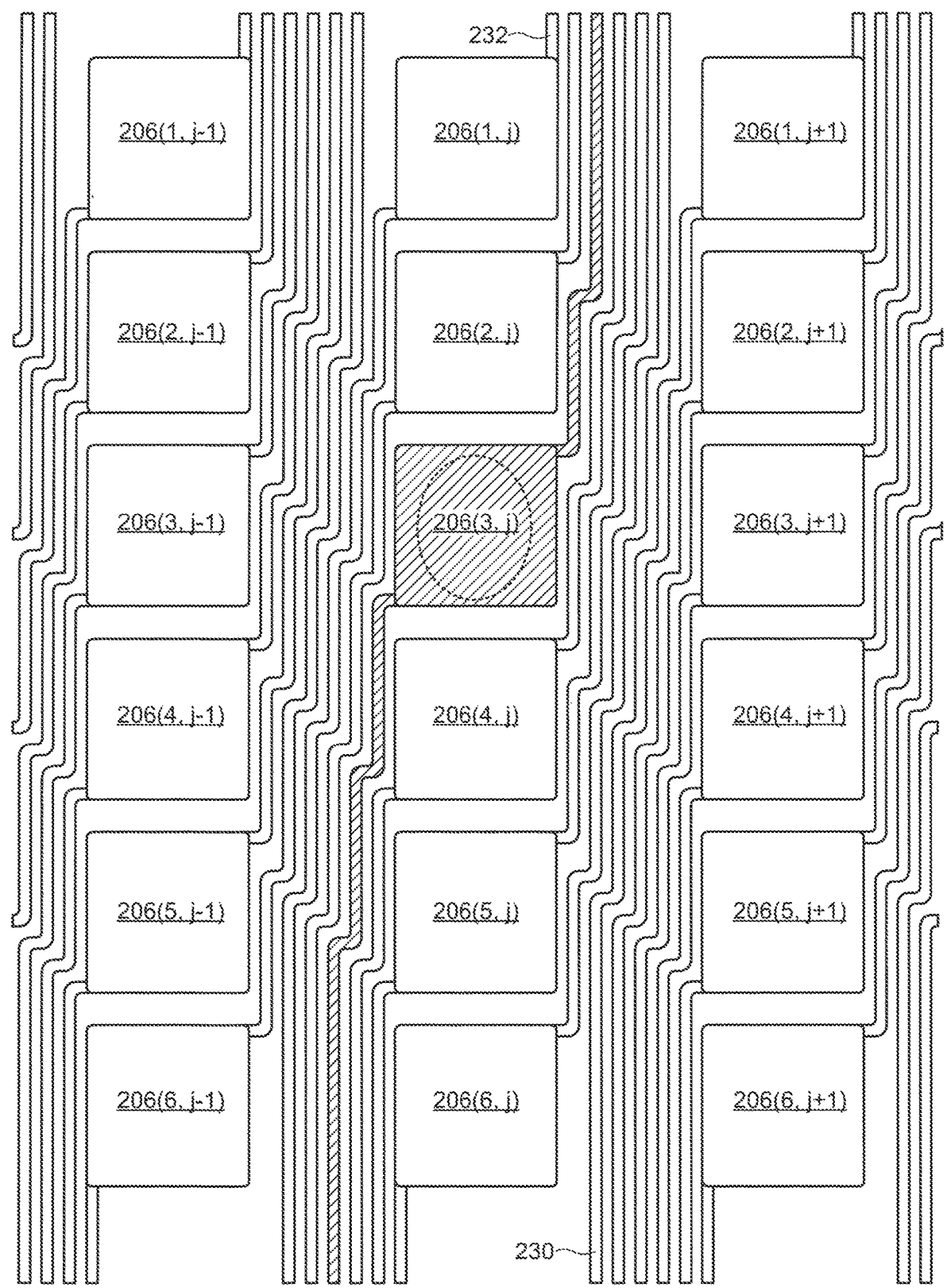
FIG. 8 is a schematic top view for explaining the operation of a sensor module according to an embodiment of the present invention.
Figure 9:
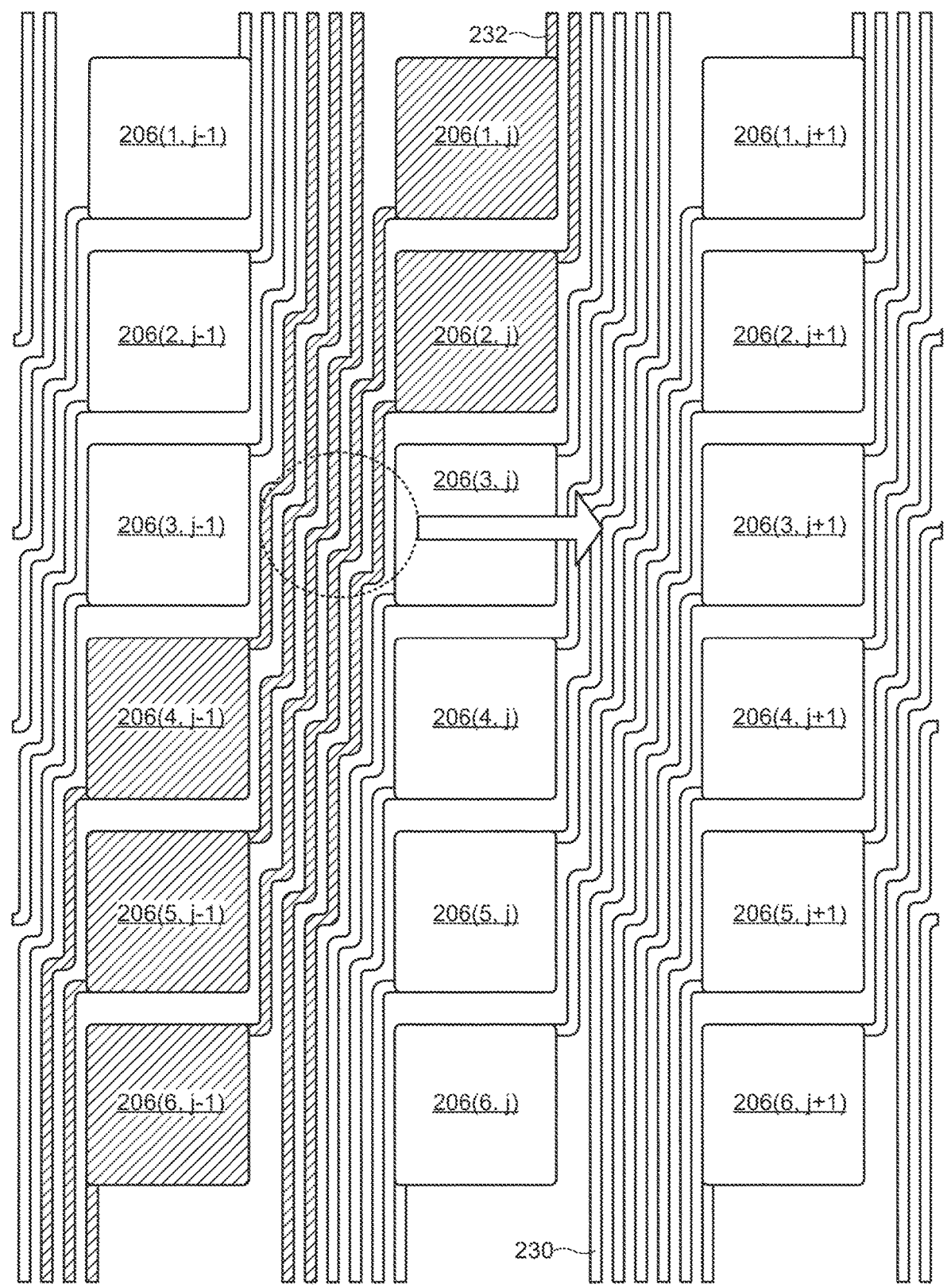
FIG. 9 is a schematic top view for explaining the operation of a sensor module according to an embodiment of the present invention.
Figure 10:
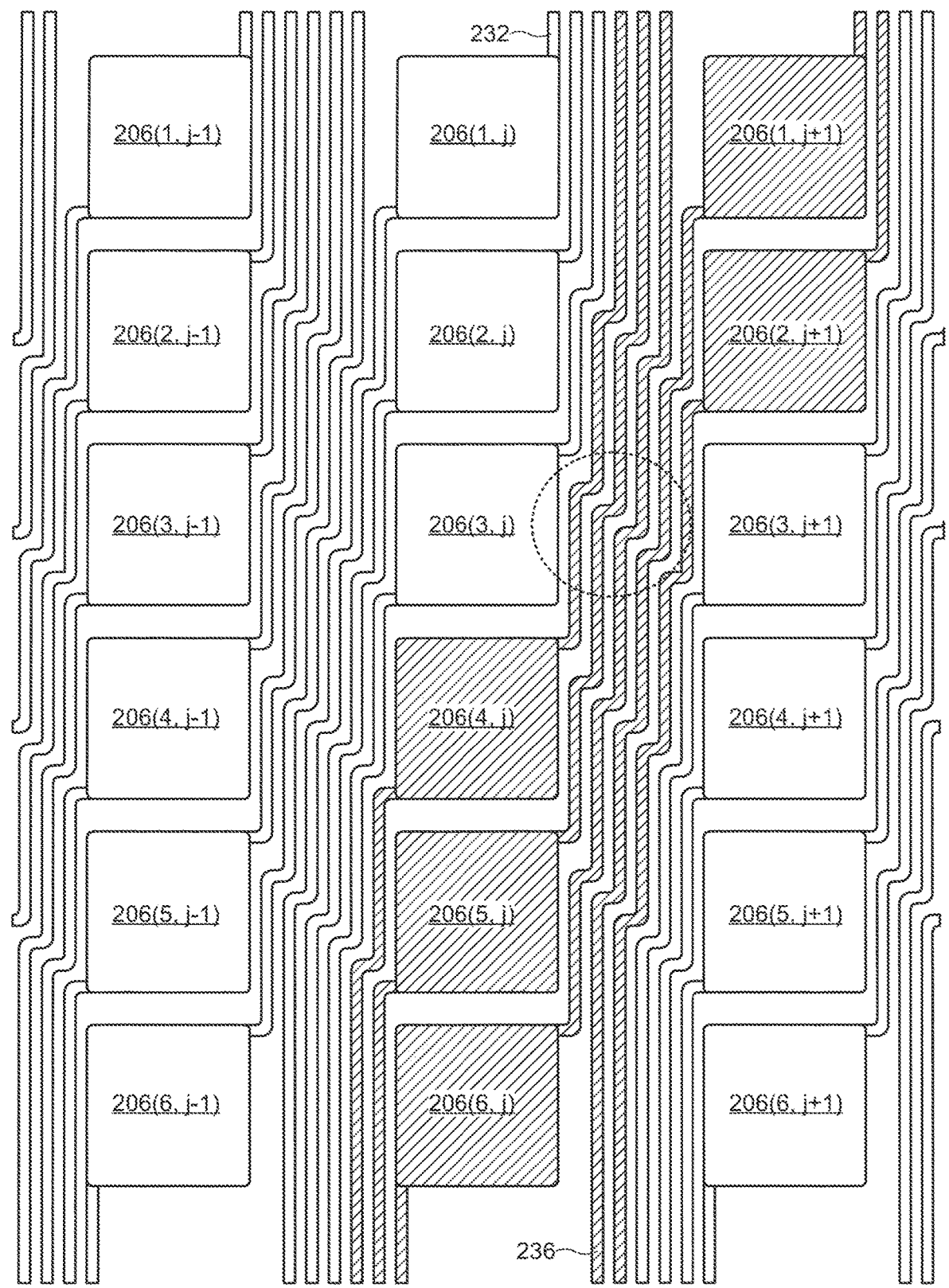
FIG. 10 is a schematic top view for explaining the operation of a sensor module according to an embodiment of the present invention.

A situation where the input means is brought into proximity of the sensor module 200 from the top of the sensor module 200 is explained using the schematic top views in FIG. 8 through FIG. 10. In these figures, a part of the sensor module 200 in which the total number of rows is 6 is schematically illustrated.

As an example, when the input means is selectively brought into proximity on one sensor electrode 206 (here, the sensor electrode 206(3, j)) as shown by the dotted ellipse in FIG. 8, a virtual capacitive element is formed between this sensor electrode 206(3, j) and the input means. Hence, the potentials of the hatched sensor electrode 206(3, j) as well as the sensor wiring 230 and auxiliary wiring 232 connected thereto fluctuate. Although the potentials of other sensor electrodes 206 as well as the sensor wirings 230 and the auxiliary wirings 232 connected thereto may also change due to the secondary effects described above, the amount of change thereof is negligible. Therefore, the input position can be accurately identified using the sensor value acquired by the potential fluctuation of one sensor electrode 206.

In contrast, when the input means overlaps not only one sensor electrode 206 but also its left side ((j−1)th column side) as shown by the dotted ellipse in FIG. 9, an electrostatic capacitance is also formed not only with this sensor electrode 206 (the sensor electrode 206(3, j) in this case) but also with other components, specifically, the sensor wirings 230 and the auxiliary wirings 232 overlapping the input means. Since the sensor wiring 230 and the auxiliary wiring 232 are equipotential with the sensor electrode 206 connected thereto, the potentials of the sensor electrodes 206 connected to these wirings also fluctuate due to the formed electrostatic capacitance. As a result, the sensor values of the sensor electrodes 206 other than the sensor electrode 206 overlapping the input means also increase. In the example in FIG. 9, the potentials of the hatched sensor electrodes 206 in the fourth row and the (j−1)th column to the sensor electrode 206 in the sixth row and the (j−1)th column as well as the sensor electrode 206 in the first row and the jth column and the sensor electrode 206 in the second row and the jth column also fluctuate, and as a result, the sensor values of these sensor electrodes 206 also increase.

When identifying the row of the input position, not only the sensor value of the sensor electrode providing the highest sensor value (hereinafter, referred to as a peak electrode) (in the example in FIG. 9, the sensor value of the sensor electrode 206(3, j)), but also the sensor values one or two sensor electrodes adjacent to the peak electrode in the column direction (here, sensor electrode 206(2, j) and the sensor electrode 206(4, j)) are used. Accordingly, when the peak electrode is the sensor electrode 206($i, j$) in the ith row and the jth column, the identified input position shifts to the column direction (i.e., to the (i−1)th row side which is the second row side in the example in FIG. 9) compared to the actual input position.

Next, consider a case where the input means is shifted parallel to the row direction as indicated by the hollow arrow of FIG. 9 (FIG. 10). As shown by the dotted ellipse in FIG. 10, when the input position after the movement overlaps not only one sensor electrode 206 but also its right side (the (j+1)th column side), not only this sensor electrode 206 but also other sensor wirings 230 and auxiliary wirings 232 overlapping the input means form electrostatic capacitance with the input means, resulting in the fluctuation of the potentials of the sensor electrodes 206 connected thereto to increase the sensor values. In the example in FIG. 10, the sensor values of the hatched sensor electrodes 206 in the fourth row and the jth column to the sensor electrode 206 in the sixth row and the jth column, the sensor electrode 206 in the first row and the (j+1)th column, and the sensor electrode 206 in the second row and the (j+1)th column also increase. As a result, when the peak electrode is the sensor electrode 206($i, j$) in the ith row and the jth column, the identified input position shifts to the (i+1)th row side (the fourth row side in the example in FIG. 10) compared to the actual input position.

Figure 11A:
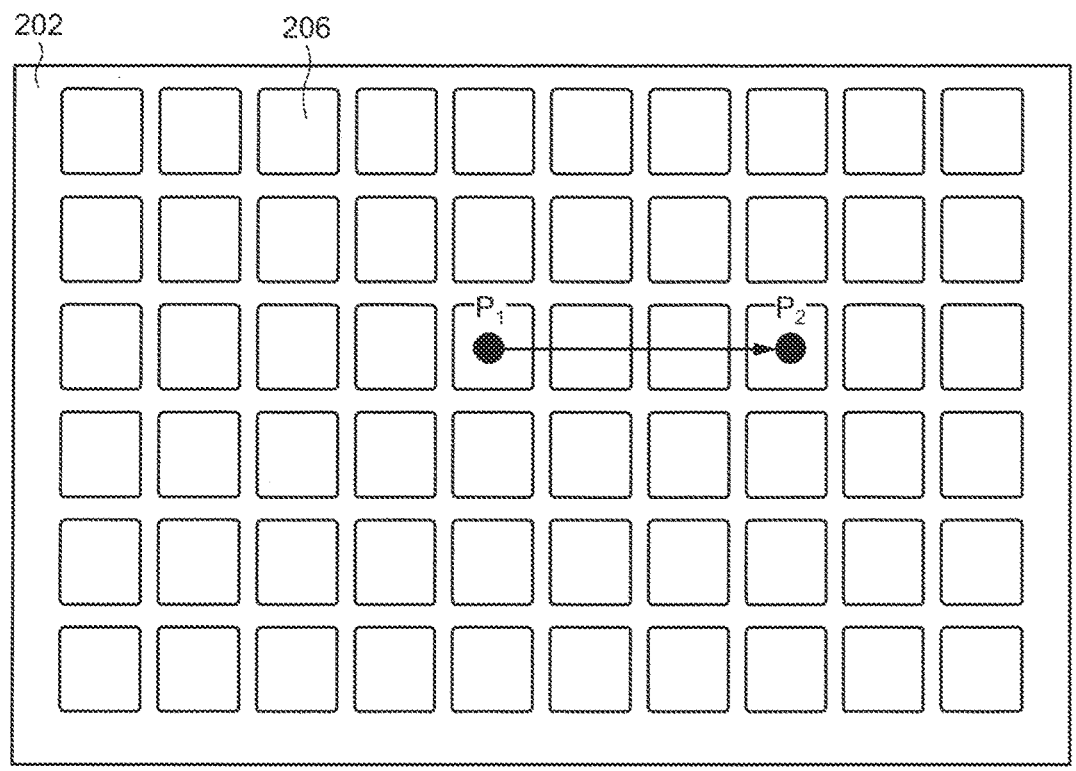
FIG. 11A is a schematic top view for explaining the operation of a sensor module according to an embodiment of the present invention.
Figure 11B:
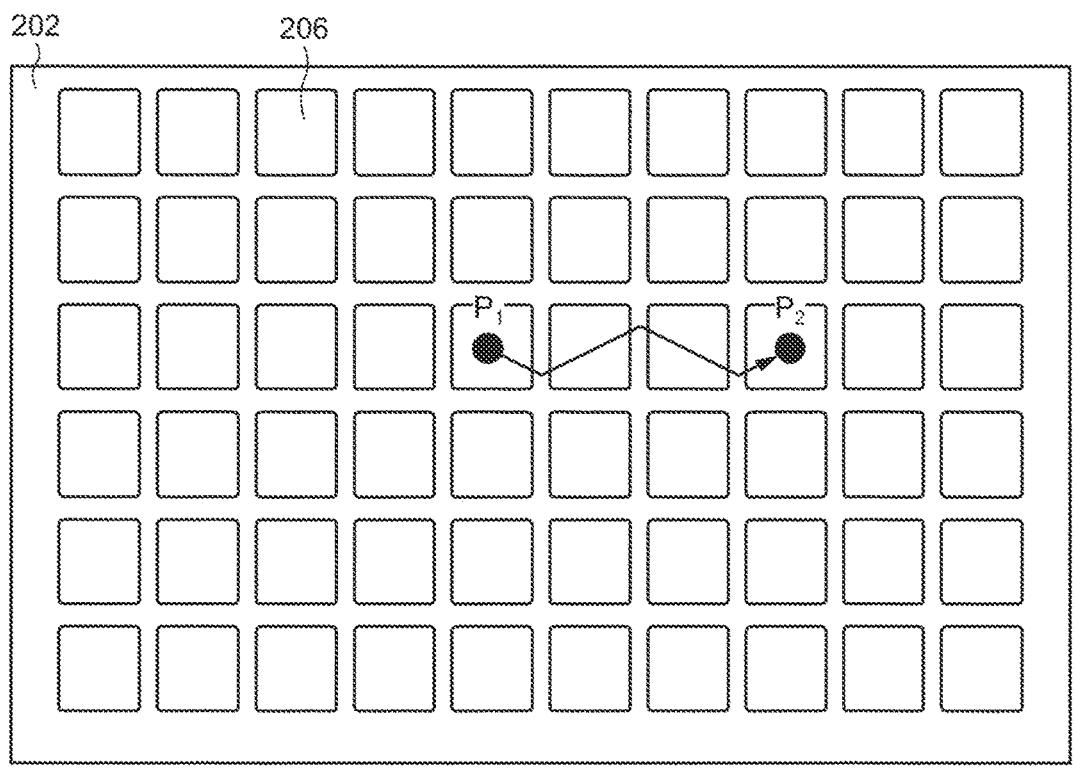
FIG. 11B is a schematic top view for explaining the operation of a sensor module according to an embodiment of the present invention.

Thus, since not only the electrostatic capacitance formed by the sensor electrode 206 (i.e., peak electrode) to which the input means is closest, but also the electrostatic capacitance formed by the sensor wirings 230 and auxiliary wirings 232 operate, even when the input means linearly scans in the row direction from point $P_1$ to point P2 as shown in FIG. 11A, for example, the locus of the input means is not detected as a straight line but is detected as a zigzag-shaped locus as shown in FIG. 11B.

Figure 12:
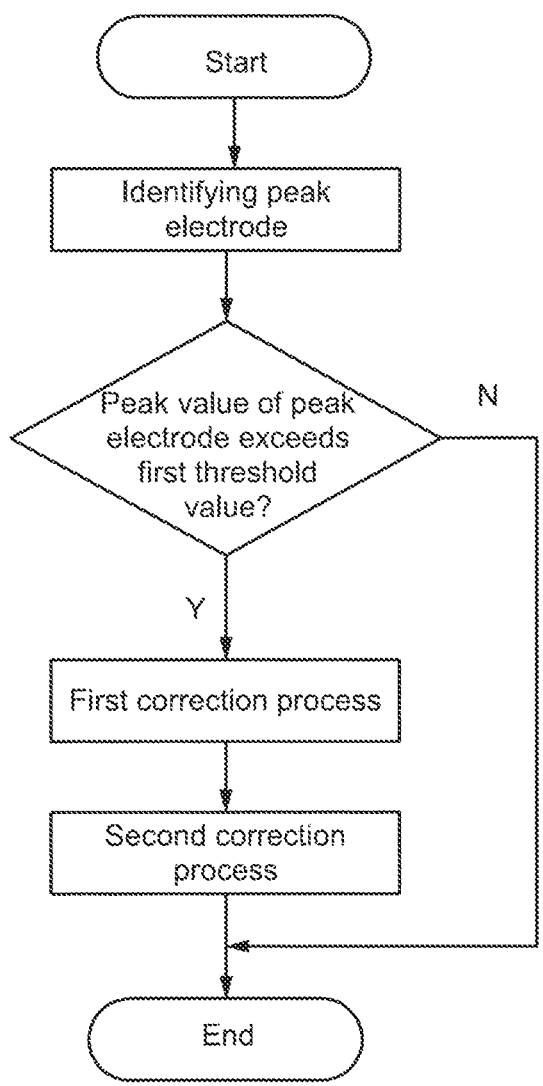
FIG. 12 is a flowchart showing an example of a correction process of a sensor module according to an embodiment of the present invention.

The correction method according to an embodiment of the present invention is a method for eliminating the above-mentioned defects, in which the driver circuit 216 is used to perform a correction process to decrease or eliminate the influences of the electrostatic capacitance formed by the input means and a part of the plurality of sensor wirings 230 and the electrostatic capacitance formed by the input means and a part of the plurality of auxiliary wirings 232 (hereinafter, these influences are referred to as wiring influence). Hereinafter, this correction method is explained using the flowcharts in FIG. 12 to FIG. 14.

4-1. Identification of Peak Electrode

First, the peak electrode is identified. As described above, all of the sensor electrodes 206 are constantly supplied with a pulsed AC voltage from the power circuit 218 of the driver circuit 216, and the detector 220 detects the changes in the capacitance of the sensor electrodes 206 as potential fluctuations. The detector 220 digitizes these potential fluctuations to convert them into the detection signals. The detection signals generated by the detector 220 are input to the computing element 222, and the sensor value of each sensor electrode 206 is obtained on the basis of the detection signals. Therefore, when the input means is brought into proximity, the sensor electrode 206 closest to the input position, more specifically, the sensor electrode 206 that forms the largest electrostatic capacitance with the input means, shows the largest potential fluctuation and thus the highest sensor value. The sensor electrode 206 exhibiting the maximum sensor value is identified as the peak electrode.

Hereinafter, the explanation continues below assuming that the peak electrode is the sensor electrode $206(i, j)$ located in the ith row and jth column.

Here, a case where the sensor value of the peak electrode is equal to or less than a certain value (first threshold value) means that the distance from the input means to the sensor module 200 is large. In this case, since the electrostatic capacitance formed between the components other than the peak electrode and the input means is negligible, the wiring influence is small and there is little need for correction. Therefore, when the sensor value of the peak electrode is judged by the driver circuit 216 to be equal to or less than the first threshold value, the present correction method may not be performed. However, in a case where more precise input position identification is required, the present correction method may be performed even if the sensor value of the peak electrode is equal to or less than the first threshold value. The first threshold value may be selected from a range equal to or more than 50% and equal to or less than 100% or equal to or more than 60% and equal to or less than 100% of the maximum sensor value (saturated sensor value) which can be output by the computing element 222. Alternatively, the first threshold value may be determined on the basis of the distance from the input means to the sensor module 200. For example, the sensor value at the time when the input means is present at a distance where the wiring influence begins to appear (e.g., a distance equal to or more than 0 mm and equal to or less than 20 mm from the sensor module 200) may be selected as the first threshold value.

When the sensor value of the peak electrode is judged by the driver circuit 216 to exceed the first threshold value, the present correction method is performed by the driver circuit 216 because the sensor electrodes 206 other than the peak electrode may be affected by the wiring influence. This correction method includes a first correction process and a second correction process, and at least one of them is performed. Hereinafter, although an example is explained where the second correction process is performed after the first correction process is performed, the first correction process may be performed after the second correction process is performed. In addition, only one of the first correction process and the second correction process may be performed.

4-2. First Correction Process

Figure 13:
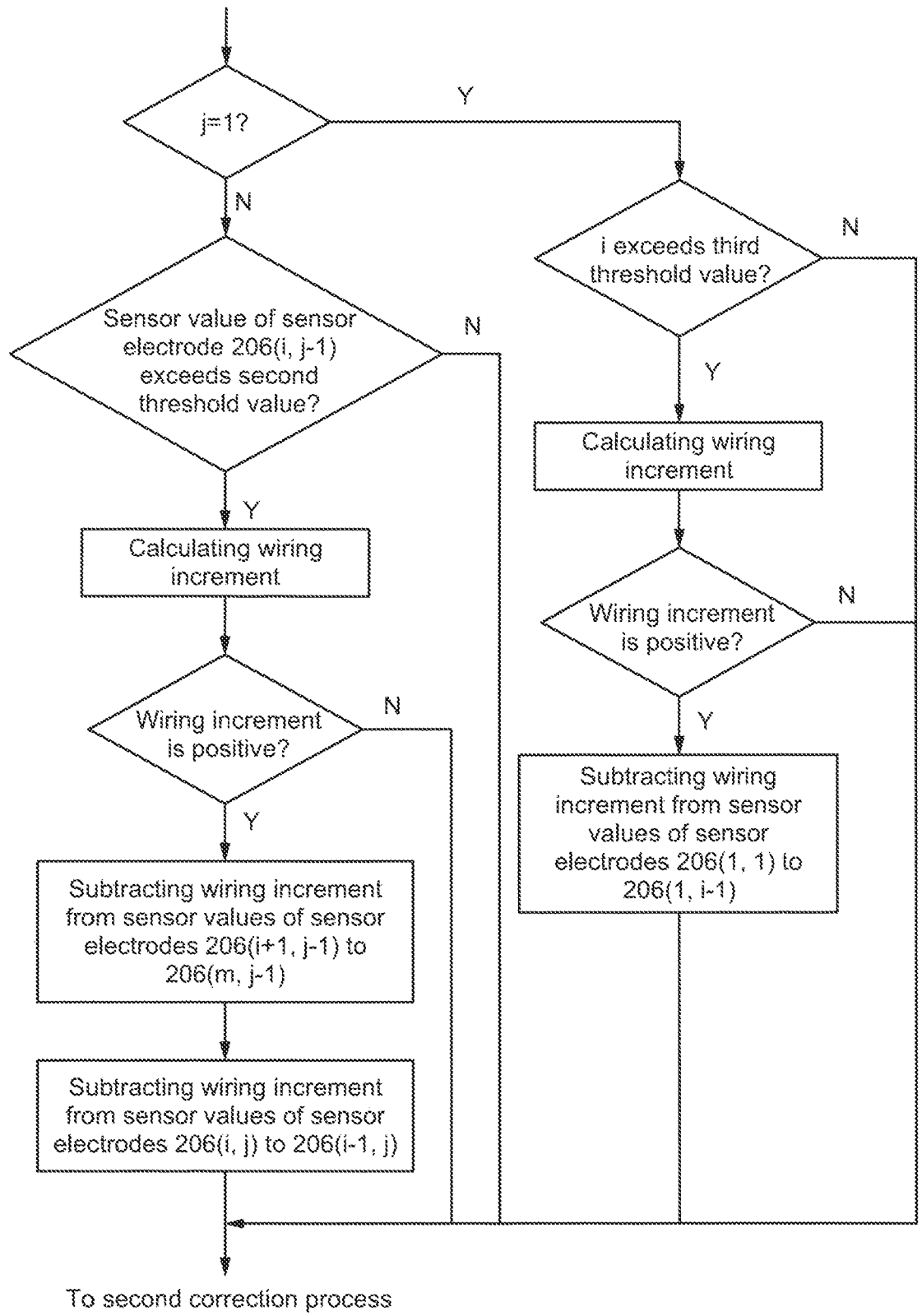
FIG. 13 is a flowchart showing an example of a correction process of a sensor module according to an embodiment of the present invention.

FIG. 13 shows a flowchart of the first correction process. The first correction process is a correction to reduce or eliminate the wiring influence of the input means on the side where the sensor wiring 230 of the peak electrode is provided (i.e., the (j−1)th column side). Therefore, in the first correction process, the processing method differs depending on the column where the peak electrode exists.

(1) Case where $j \neq 1$

As shown in FIG. 13, when $j \neq 1$, that is, when the peak electrode exists in a column other than the first column, it is judged whether the sensor value of the sensor electrode $206(i, j)$, which is located in the same row as the peak electrode (i.e., the ith row) and in the column (i.e., the (j−1)th column) on the side of the sensor wiring 230 connected to that peak electrode, exceeds a certain value (second threshold value). In the example shown in FIG. 9, since the peak electrode is the sensor electrode $206(3, j)$, it is judged whether the sensor value of sensor electrode $206(3, j-1)$ in the adjacent column on the sensor wiring 230 side connected to the sensor electrode $206(3, j)$ exceeds the second threshold value. Hereinafter, the sensor electrode $206(i, j-1)$, which is located in the same row as the sensor electrode $206(i, j)$ that is the peak electrode and in the adjacent column on the side of the sensor wiring 230 connected to the peak electrode is called a first reference electrode. The second threshold value may be selected from a range equal to or more than 50% and equal to or less than 100% or equal to or more than 50% and equal to or less than 80% of the sensor value of the peak electrode, as appropriate. Alternatively, the second threshold value may also be determined on the basis of the distance from the input means to the sensor module 200. For example, the sensor value of the first reference electrode when the input means is placed at a certain distance from the sensor module 200 (e.g., a distance selected from a range equal to or more than 0 mm and equal to or less than 20 mm) may be selected as the second threshold value.

A case where the sensor value of the first reference electrode does not exceed the second threshold value means that the sensor value of the first reference electrode is sufficiently low relative to the sensor value of the peak electrode. This means that no large electrostatic capacitance is formed between the input means and the first reference electrode, and therefore, it can be judged that the input means does not also form a large electrostatic capacitance with the sensor wirings 230 and the auxiliary wirings 232 located between the first reference electrode and the peak electrode. Hence, the wiring influence does not case a serious problem because the sensor values of the sensor electrode 206 in the (i−1)th row and the jth column and/or the sensor electrode 206 in the (i+1)th row and the jth column used to determine the input position are also sufficiently low compared to that of the peak electrode. Thus, when the sensor value of the first reference electrode is judged not to exceed the second threshold value, the first correction process may not be performed. However, even in this case, the first correction process may be performed when a more precise input position identification is required, for example.

On the contrary, a case where the sensor value of the first reference electrode exceeds the second threshold value means that the sensor value of the first reference electrode is relatively high, although it is lower than that of the peak electrode. This means that a large electrostatic capacitance is formed between the input means and the first reference electrode. Hence, it can be judged that the input means also forms a large electrostatic capacitance with the sensor wirings 230 and the auxiliary wirings 232 located between the first reference electrode and the peak electrode. Thus, since the sensor values of the sensor electrode 206 in the (i−1)th row and the jth column and/or the sensor electrode 206 in the (i+1)th row and the (j−1)th column are also relatively high, the input position identification is considerably affected by the wiring influence. Therefore, the following process is performed to reduce or eliminate the wiring influence.

(1-1) Calculation of Wiring Increment

In this process, the sensor electrode 206 with the least influence of the electrostatic capacitance formed by the proximity of the input means is first selected from the sensor electrodes 206 connected to the sensor wirings 230 or the auxiliary wirings 232 which are considered to form the electrostatic capacitance with the input means. Specifically, the smallest sensor value (minimum sensor value) is selected from the sensor values of the sensor electrode 206 in the (i+1)th row and the (j−1)th column to the sensor electrode 206 in the mth row and the (j−1)th column and the sensor electrode 206 in the first row and the jth column to the sensor electrode 206 in the (i−1)th row and the jth column, which are affected by the wiring influence. When an example is shown using FIG. 9, since the peak electrode is sensor electrode 206(3, j), the minimum sensor value is selected from the sensor values of the hatched sensor electrodes 206 (i.e., the sensor electrode 206 in the fourth row and the (j−1)th column to the sensor electrode 206 in the sixth row and the (j−1)th column, the sensor electrode 206 in the first row and the jth column, and the sensor electrode 206 in the second row and the jth column). Since some of the above sensor electrodes 206 may not actually exist depending on the relationship between i and m, the minimum sensor value is selected from the sensor values of the actually existing sensor electrode 206 included in the aforementioned sensor electrodes 206. This minimum sensor value is the sensor value from which the electrostatic capacitance formed by the input means and each sensor electrode 206 is eliminated as much as possible and which reflects the wiring influence of the electrostatic capacitance formed by the input means and the sensor electrodes 206 or by the electrostatic capacitance formed between the input means and the sensor wirings 240.

Next, the wiring increment is calculated. Specifically, when the sensor electrode 206 exhibiting the minimum sensor value is in the jth column, the sensor electrode 206 in the same row as the sensor electrode 206 exhibiting the minimum sensor value and in the (j−1)th column that is not affected by the wiring influence is selected as a standard electrode. If the sensor electrode 206 exhibiting the minimum sensor value is located in the jth column in the example shown in FIG. 9, the sensor electrode 206(1, j−1) or 206(2, j−1) is selected as the standard electrode. On the contrary, if the sensor electrode 206 exhibiting the minimum sensor value is located in the (j−1)th column, the sensor electrode 206 in the same row as the sensor electrode 206 exhibiting the minimum sensor value and in the jth column that is not affected by the wiring influence is selected as the standard electrode. If the sensor electrode 206 exhibiting the minimum sensor value is located in the (j−1)th column in the example demonstrated in FIG. 9, one of the sensor electrodes 206(4, j) to 206(6, j) is selected as the reference electrode. The sensor value obtained by subtracting the sensor value of the standard electrode from the minimum sensor value is the wiring increment. Since the sensor value of the standard electrode can be regarded as not being affected by the wiring influence, this wiring increment corresponds to the increment of the sensor value caused by the wiring influence.

(1-2) Correction

Next, the wiring increment is used to perform correction. Specifically, when the wiring increment is positive, the wiring increment is subtracted from the sensor values of the sensor electrodes 206 affected by the wiring influence. That is, correction to subtract the sensor increment is performed on the sensor values of the actually existing sensor electrodes which are included in the sensor electrode 206 in the (i+1)th row and the (j−1)th column to the sensor electrode 206 in the mth row and the (j−1)th column and the sensor electrode 206 in the first row and the jth column to the sensor electrode 206 in the (i−1)th row and the jth column. In the example demonstrated in FIG. 9, the wiring increment is subtracted from the sensor values of sensor electrodes 206(4, j−1) to 206(6, j−1), the sensor electrode 206(1, j), and the sensor electrode 206(2, j).

On the other hand, a case where the wiring increment is equal to or less than 0 means that there is practically no wiring influence. Therefore, in this case, no correction is performed on the sensor values of any of the sensor electrodes 206.

The above correction can reduce or eliminate the wiring influence from the sensor values of one or two sensor electrodes 206 adjacent to the peak electrode in the column direction. As a result, the column-direction coordinate of the input position can be accurately calculated.

Note that, although one minimum sensor value is selected from all of the sensor electrodes 206 affected by the wiring influence in the calculation of the wiring increment described above, one minimum sensor value may be selected from the sensor electrodes 206 affected by the electrostatic capacitance between the input means and the auxiliary wirings 232, and at the same time one minimum sensor value may be selected from the sensor electrodes 206 affected by the electrostatic capacitance between the input means and the sensor wirings 230. Namely, if the peak electrode is assumed to be the sensor electrode 206(i, j), one minimum sensor value (first minimum sensor value) may be selected from the sensor values of the sensor electrode 206(i+1, j−1) to the sensor electrode 206(m, j−1), and one minimum sensor value (second minimum sensor value) may be selected from the sensor values of the sensor electrode 206(i−1, j) to the sensor electrode 206(i−1, j). In this case, the standard electrode is selected for each of the sensor electrodes 206 exhibiting the first and second minimum sensor values, and the wiring increments are calculated. The correction of the sensor electrode 206(i+1, j−1) to the sensor electrode 206(m, j−1) is performed by subtracting the first minimum sensor value from the sensor values thereof, and the correction of sensor electrode 206(1, j) to the sensor electrode 206(i−1, j) is performed by subtracting the second minimum sensor value from the sensor values thereof.

(2) Case where j=1

As can be understood from FIG. 3, there are no other sensor electrodes on the side where the sensor wirings 230 are provided for the sensor electrodes 206 in the first column. Hence, the first reference electrode for correction cannot be selected. Therefore, when j=1, a correction method different from the correction method described above is employed.

Figure 15:
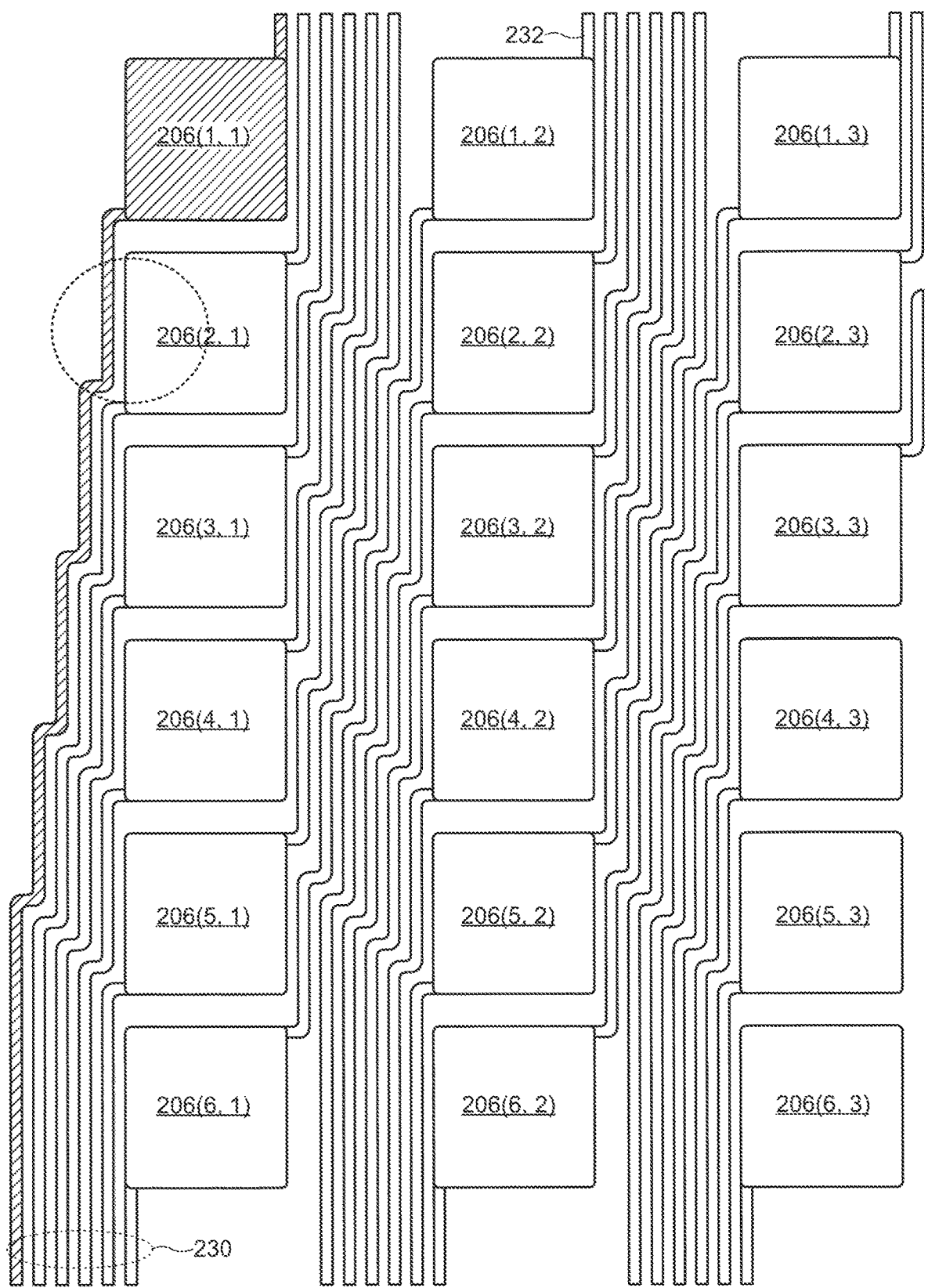
FIG. 15 is a schematic top view explaining a correction method of a sensor module according to an embodiment of the present invention.

Specifically, it is first determined whether the number of the row where the peak electrode is located, i.e., i, exceeds a certain value (first row-threshold value) (FIG. 13). The first row-threshold value may be appropriately selected from a range equal to or more than 50% and equal to or less than 80% or equal to or more than 60% and equal to or less than 80% of the total number of rows, for example. Alternatively, the first row-threshold may be the number of the row which is spaced away from the top edge of the sensor module 200 (the edge on the first row side) by 60 mm or more and 150 mm or less. A situation where i is equal to or less than the first row-threshold value is a situation where the input means is close to the sensor electrodes 206 located in the row with relatively small row numbers as shown in FIG. 15, for example. Since the density of the sensor wirings 230 decreases with decreasing row number, the sensor electrodes 206 affected by the wiring influence decreases in number approaching the first row. Hence, it is difficult to distinguish the influence by the electrostatic capacitance between the input means and the sensor electrode 206 from the wiring influence. Therefore, when i is equal to or less than the first row-threshold vale, the first correction may not be performed.

(2-1) Calculation of Wiring Increment

Figure 16:
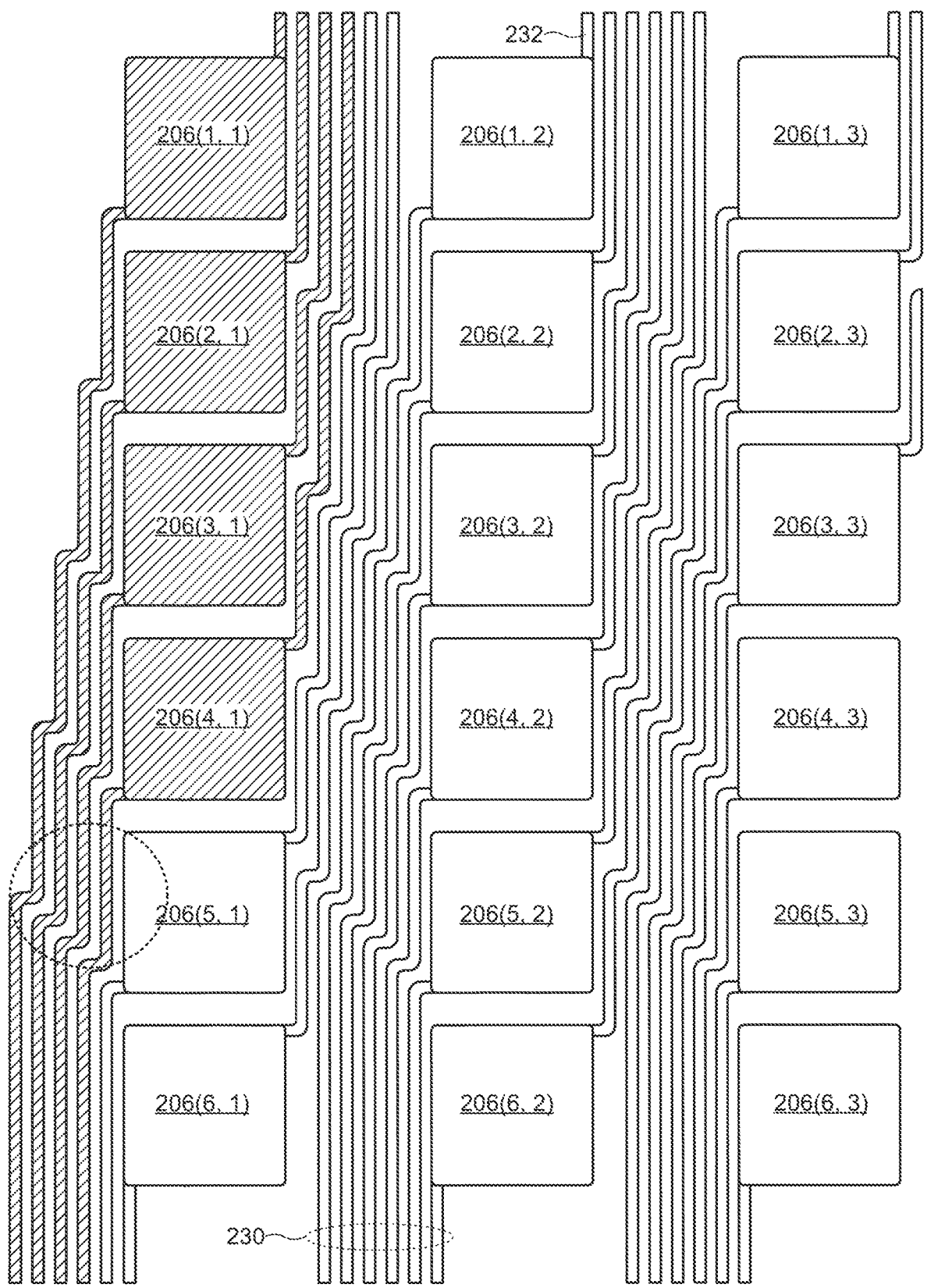
FIG. 16 is a schematic top view explaining a correction method of a sensor module according to an embodiment of the present invention.

A situation where i exceeds the first row-threshold value is a situation where the input means represented by the dotted ellipse is close to the sensor electrodes 206 located in the rows with relatively large row numbers as shown in FIG. 16. At this time, many components including the peak electrode and the sensor wirings 230 located on the opposite side to the second column with respect to this peak electrode as a center may overlap the input means. In the example in FIG. 16, the hatched sensor wirings 230 may overlap the input means. Therefore, the sensor electrodes 206 (sensor electrodes 206(1, 1) to 206(4, 1) in the example in FIG. 16) on the (i−1)th row side than the peak electrode are affected by the wiring influence. In this case, the contribution of the electrostatic capacitance between the input means and the sensor electrodes 206 is the smallest, and, at the same time, the wiring influence is reflected at the sensor electrode 206(1, 1) which is farthest from the input means. Since the wiring influence can be ignored at the sensor electrode 206(1, 2) adjacent to sensor electrode 206(1, 1) in the row direction, the value obtained by subtracting the sensor value of the sensor electrode 206(1, 2) from the sensor value of the sensor electrode 206(1, 1) is calculated as the wiring increment. This wiring increment corresponds to the increment of the sensor value caused by the wiring influence.

(2-2) Correction

When the wiring increment is equal to or less than 0, there is little need for correction because the wiring influence can be negligible. Thus, no correction may be performed on the sensor value of any of the sensor electrodes 206. On the other hand, when the wiring increment is positive, the wiring increment is subtracted from the sensor values of the sensor electrodes 206 affected by the wiring influence. Namely, a correction to subtract the wiring increment is performed on the sensor values of the sensor electrode 206 in the first row and the first column to the sensor electrode 206 in the (i−1)th row and the first column. In the example demonstrated in FIG. 16, the wiring increment is subtracted from the sensor values of the hatched sensor electrodes 206(1, 1) to 206(4, 1).

This process can reduce or eliminate the wiring influence from the sensor values of one or two sensor electrodes 206 adjacent to the peak electrode in the column direction. As a result, the column-direction coordinate of the input position can be accurately calculated.

4-3. Second Correction Process

Figure 14:
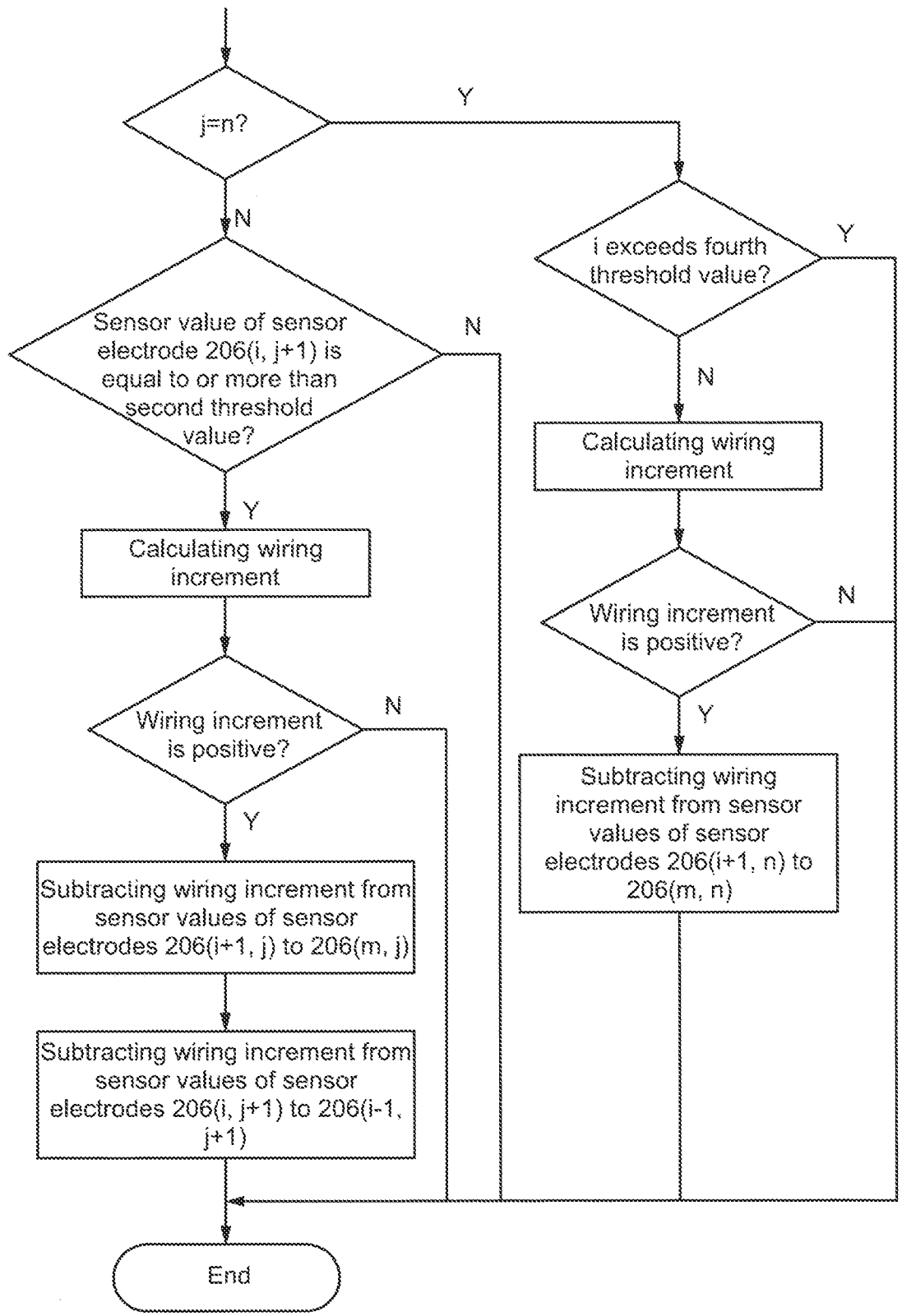
FIG. 14 is a flowchart showing an example of a correction process of a sensor module according to an embodiment of the present invention.

The flowchart of the second correction process is shown in FIG. 14. The second correction process is a correction to reduce or eliminate the wiring influence when the side where the auxiliary wiring 232 of the peak electrode is provided (i.e., the (j+1)th column side) is affected by the wiring influence from the input means. Therefore, the processing method also differs depending on the column where the peak electrode exists in the second correction process. An explanation of the contents the same as those of the first correction process may be omitted.

(1) Case where j≠n

As shown in FIG. 14, when j≠n, that is, when the peak electrode exists in a column other than the nth column, it is judged whether the sensor value of the sensor electrode 206(i, j+1), which is located in the same row (i.e., the ith row) as the peak electrode and the column (i.e., the (j+1)th column) on the side of the auxiliary wiring 232 connected to the peak electrode, exceeds the second threshold value. In the example demonstrated in FIG. 10, since the peak electrode is the sensor electrode 206(3, j), it is judged whether the sensor value of sensor electrode 206(3, j+1) in the adjacent column on the auxiliary wiring 232 side connected to sensor electrode 206(3, j) exceeds the second threshold value. Hereafter, the sensor electrode 206(i, j+1) located in the same row as the sensor electrode, which is the peak electrode, and in the adjacent column on the side of the auxiliary wiring 232 connected to the peak electrode is called a second reference electrode.

A case where the sensor value of the second reference electrode does not exceed the second threshold value means that the sensor value of the second reference electrode is sufficiently low relative to the sensor value of the peak electrode. This means that no large electrostatic capacitance is formed between the input means and the second reference electrode, and therefore, it can be determined that the input means does not also form a large electrostatic capacitance with the sensor wirings 230 and auxiliary wirings 232 located between the second reference electrode and the peak electrode. Thus, since the sensor values of the sensor electrode 206 in the (i−1)th row and the jth column and the sensor electrode 206 in the (i+1)th row and the jth column are also sufficiently low compared to that of the peak electrode, the wiring influence is not a serious problem. Therefore, when the sensor value of the second reference electrode is judged not to exceed the second threshold value, the second correction process may not be performed. However, the second correction process may be performed even in this case when more precise identification of the input position is required, for example.

On the contrary, a case where the sensor value of the second reference electrode exceeds the second threshold value means that the sensor value of the second reference electrode is relatively high, although it is lower than the sensor value of the peak electrode. This means that a large electrostatic capacitance is formed between the input means and the second reference electrode, and therefore, it can be judged that the input means also forms a large electrostatic capacitance with the sensor wirings 230 and the auxiliary wirings 232 arranged between the second reference electrode and the peak electrode. Hence, since the sensor values of the sensor electrode 206 in the (i−1)th row and the jth column and the sensor electrode 206 in the (i+1)th row and the jth column are also relatively high, the input position identification is considerably affected by the wiring influence. Therefore, the following process is performed to reduce or eliminate the wiring influence.

(1-1) Calculation of Wiring Increment

In this process, similar to the first correction process, the sensor electrode 206 with the smallest influence of the electrostatic capacitance formed by the proximity of the input means is selected from the sensor electrodes 206 connected to the sensor wirings 230 or the auxiliary wirings 232 which are considered to form the electrostatic capacitance with the input means. Specifically, the smallest sensor value is selected from the sensor values of the sensor electrode 206 in the (i+1)th row and jth column to the sensor electrode 206 in the mth row and the jth column and the sensor values of the sensor electrode 206 in the first row and the (j+1)th column to the sensor electrode 206 in the (i−1)th row and the (j+1)th column. When FIG. 10 is used as an example, since the peak electrode is the sensor electrode 206(3, j), the minimum sensor value is selected from the sensor values of the hatched sensor electrodes 206 (i.e., the sensor electrodes 206 in the fourth row and the jth column to the sensor electrode 206 in the sixth row and the jth column, the sensor electrode 206 in the first row and the (j+1)th column, and the sensor electrode 206 in the second row and the (j+1)th column). Since some of the above sensor electrodes 206 may not actually exist depending on the relationship between i and m, the minimum sensor value is selected from the sensor values of the actually existing sensor electrodes 206 included in the aforementioned sensor electrodes 206. This minimum sensor value is also a sensor value from which the electrostatic capacitance formed by the input means and each sensor electrode 206 is eliminated as much as possible and which reflects the wiring influence of the electrostatic capacitance formed between the input means and the sensor wirings 230 or by the electrostatic capacitance formed between the input means and the auxiliary sensor wirings 232.

Next, the wiring increment is calculated. Specifically, when the sensor electrode 206 exhibiting the minimum sensor value is located in the jth column, the sensor electrode 206 in the same row as the sensor electrode 206 exhibiting the minimum sensor value and in the (j+1)th column which is not affected by the wiring influence is selected as a standard electrode. When the sensor electrode 206 exhibiting the minimum sensor value is located in the jth column in the example demonstrated in FIG. 10, one of the sensor electrodes 206(4, j+1) to 206(6, j+1) is the standard electrode. On the contrary, when the sensor electrode 206 exhibiting the minimum sensor value is located in the (j+1)th column, the sensor electrode 206 in the same row as the sensor electrode exhibiting the minimum sensor value and in the jth column which is not affected by the wiring influence is selected as the standard electrode. When the sensor electrode 206 exhibiting the minimum sensor value is located in the (j+1)th column in the example demonstrated in FIG. 10, one of the sensor electrodes 206(1, j) and 206(2, j) is the standard electrode. The value obtained by subtracting the sensor value of the standard electrode from the minimum sensor value is the wiring increment. Since the sensor value of the standard electrode can be regarded as not being affected by the wiring, this wiring increment also corresponds to the increment of the sensor value caused by the wiring influence.

(1-2) Correction

Next, correction is performed using the wiring increment. Specifically, when the wiring increment is positive, the wiring increment is subtracted from the sensor value of the sensor electrode 206 affected by the wiring influence. That is, correction to subtract the wiring increment is performed on the actually existing sensor electrodes 206 included in the sensor electrode 206 in the (i+1)th row and the jth column to the sensor electrode 206 in the mth row and the jth column and the sensor electrode 206 in the first row and the (j+1)th column to the sensor electrode 206 in the (i−1)th row and the (j+1)th column. In the example demonstrated in FIG. 10, the wiring increment is subtracted from the sensor values of the sensor electrodes 206(4, j) to 206(6, j), the sensor electrode 206(1, j+1), and the sensor electrode 206(2, j+1).

On the other hand, a case where the wiring increment is equal to or less than 0 means that there is practically no wiring influence. Therefore, in this case, no correction may be performed on the sensor value of any of the sensor electrodes 206.

The above correction can reduce or eliminate the wiring influence from the sensor values of one or two sensor electrodes 206 adjacent to the peak electrode in the column direction. As a result, the column-direction coordinate of the input position can be accurately calculated.

Similar to the first correction process, one minimum sensor value may be selected from the sensor electrodes 206 affected by the electrostatic capacitance between the input means and the auxiliary wirings 232, and at the same time one minimum sensor value may be selected from the sensor electrodes 206 affected by the electrostatic capacitance between the input means and the sensor wirings 230. That is, if the peak electrode is assumed to be the sensor electrode 206(i, j), a third minimum sensor value may be selected from the sensor electrode 206(i+1, j) to the sensor electrode 206(m, j), and a fourth minimum sensor value may be selected from the sensor electrode 206(1, j+1) to the sensor electrode 206(i−1, j+1). In this case, the reference electrode is selected for each of the sensor electrodes 206 providing the third and fourth minimum sensor values, and the wiring increment is calculated. The correction of the sensor electrode 206(i+1, j) to the sensor electrode 206(m, j) is performed by subtracting the third minimum sensor value from the sensor values of these electrodes, and the correction of the sensor electrode 206(1, j+1) to the sensor electrode 206(i−1, j+1) is performed by subtracting the fourth minimum sensor value from the sensor values of these electrodes.

(2) Case where j=n

As can be understood from FIG. 3, there are no other sensor electrodes on the side where the auxiliary wirings 232 of the sensor electrodes 206 in the nth column are provided. Hence, the second reference electrode for correction cannot be selected. Therefore, when j=n, a correction method different from the correction method described above is employed.

Figure 17:
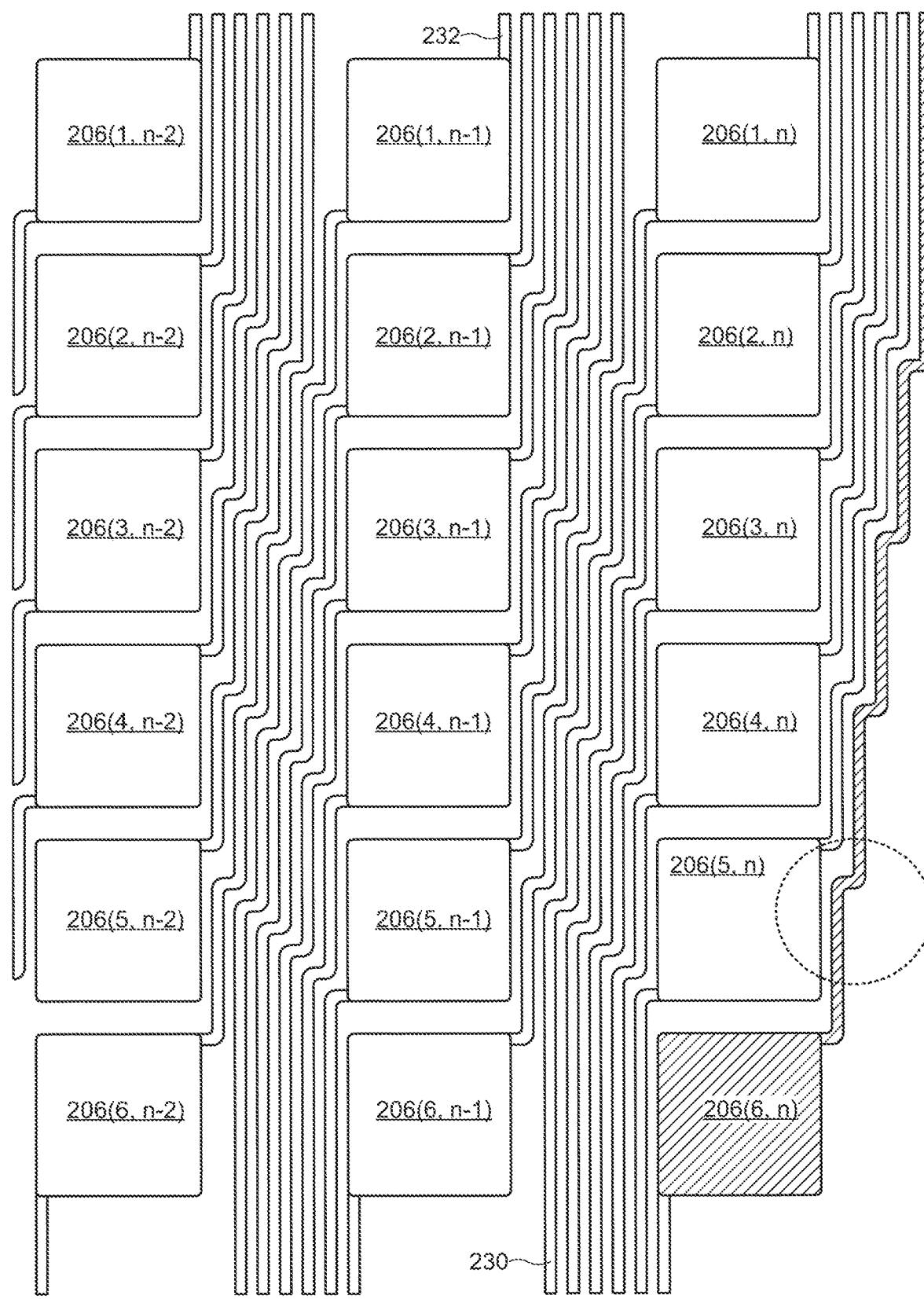
FIG. 17 is a schematic top view explaining a correction method of a sensor module according to an embodiment of the present invention.

Specifically, it is first judged whether the number of the row in which the peak electrode is located, i.e., i, exceeds a certain value (second row-threshold value) (FIG. 14). The second row-threshold value may be appropriately selected from a range equal to or more than of 20% and equal to or less than 50% or equal to or more than 20% and equal to or less than 40% of m which is the total number of rows, for example. Alternatively, the second row-threshold value may be the row number spaced away from the bottom edge of the sensor module 200 (the edge on the mth row side) by 60 mm or more and 150 mm or less. A situation where i exceeds the second row-threshold value is a situation where the input means is close to the sensor electrodes 206 located in the rows with relatively large row numbers as shown in FIG. 17, for example. Since the density of the auxiliary wirings 232 decreases with increasing row number, the closer the input position is to the mth row, the fewer sensor electrodes 206 are affected by the wiring influence. Thus, it is difficult to distinguish the influence by the electrostatic capacitance between the input means and the sensor electrodes 206 from the wiring influence. Therefore, when i exceeds the second row-threshold value, the second correction may not be performed.

(2-1) Calculation of Wiring Increment

Figure 18:
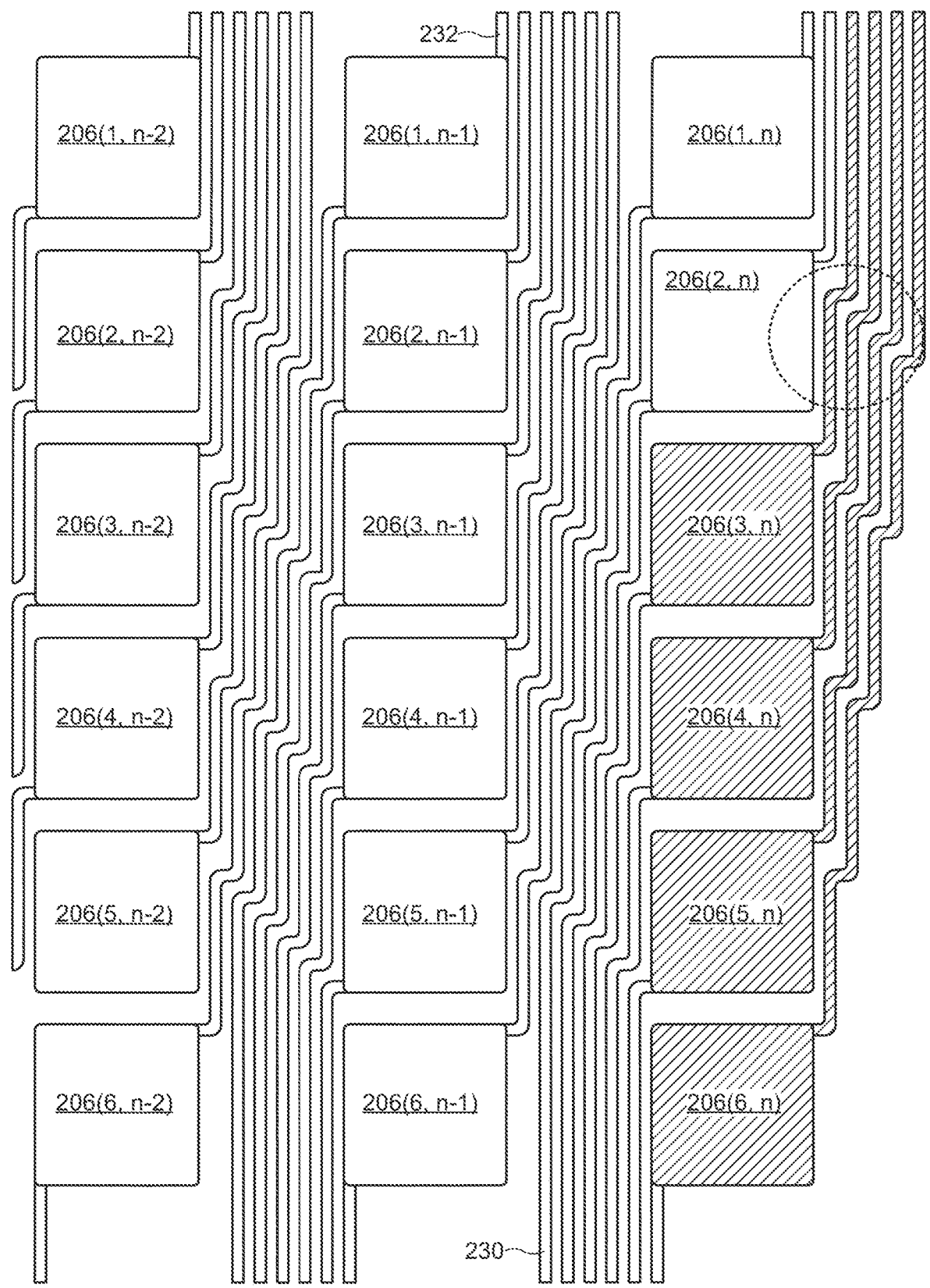
FIG. 18 is a schematic top view explaining a correction method of a sensor module according to an embodiment of the present invention.

A situation where i is equal to or less than the second row-threshold value is a situation where the input means represented by the dotted ellipse is close to the sensor electrodes 206 located in the rows with relatively small row numbers as shown in FIG. 18. At this time, many components including the peak electrode and the auxiliary wirings 232 located on the opposite side to the nth column with respect to this peak electrode as a center may overlap the input means. In the example in FIG. 18, the hatched auxiliary wirings 232 may overlap the input means. Hence, the sensor electrodes 206 (the sensor electrodes 206(3, n) to 206(6, n) in the example in FIG. 18) on the (i+1)th row side than the peak electrode are affected by the wiring influence. In this case, the contribution of the electrostatic capacitance between the input means and sensor electrode 206 is smallest, and at the same time, the wiring influence is reflected in the sensor electrode 206(m, n), which is the farthest from the input position. Since the sensor influence can be neglected in the sensor electrode 206(m, n−1) adjacent to the sensor electrode 206(m, n) in the row direction, the value obtained by subtracting the sensor value of the sensor electrode 206(m, n−1) from the sensor value of the sensor electrode 206(m, n) is calculated as the wiring increment. This wiring increment corresponds to the increment of the sensor value caused by the wiring influence.

(2-2) Correction

When the wiring increment is equal to or less than 0, since the wiring effect is negligible, there is little need for correction. Thus, no correction may be performed on any of the sensor values of the sensor electrodes 206. On the other hand, when the wiring increment is positive, the wiring increment is subtracted from the sensor values of the sensor electrodes 206 affected by the wiring influence. That is, a correction to subtract the wiring increment is performed on the sensor values of the sensor electrode 206 in the (i+1)th row and the nth column to the sensor electrode 206 in the mth row and the nth column. In the example demonstrated in FIG. 18, the wiring increment is subtracted from the sensor values of the hatched sensor electrodes 206(3, n) to 206(6, n).

This process can reduce or eliminate the wiring influence from the sensor values of one or two sensor electrodes 206 adjacent in the column direction to the peak electrode. As a result, the column-direction coordinate of the input position can be accurately calculated.

5. Modified Examples

Figure 19:
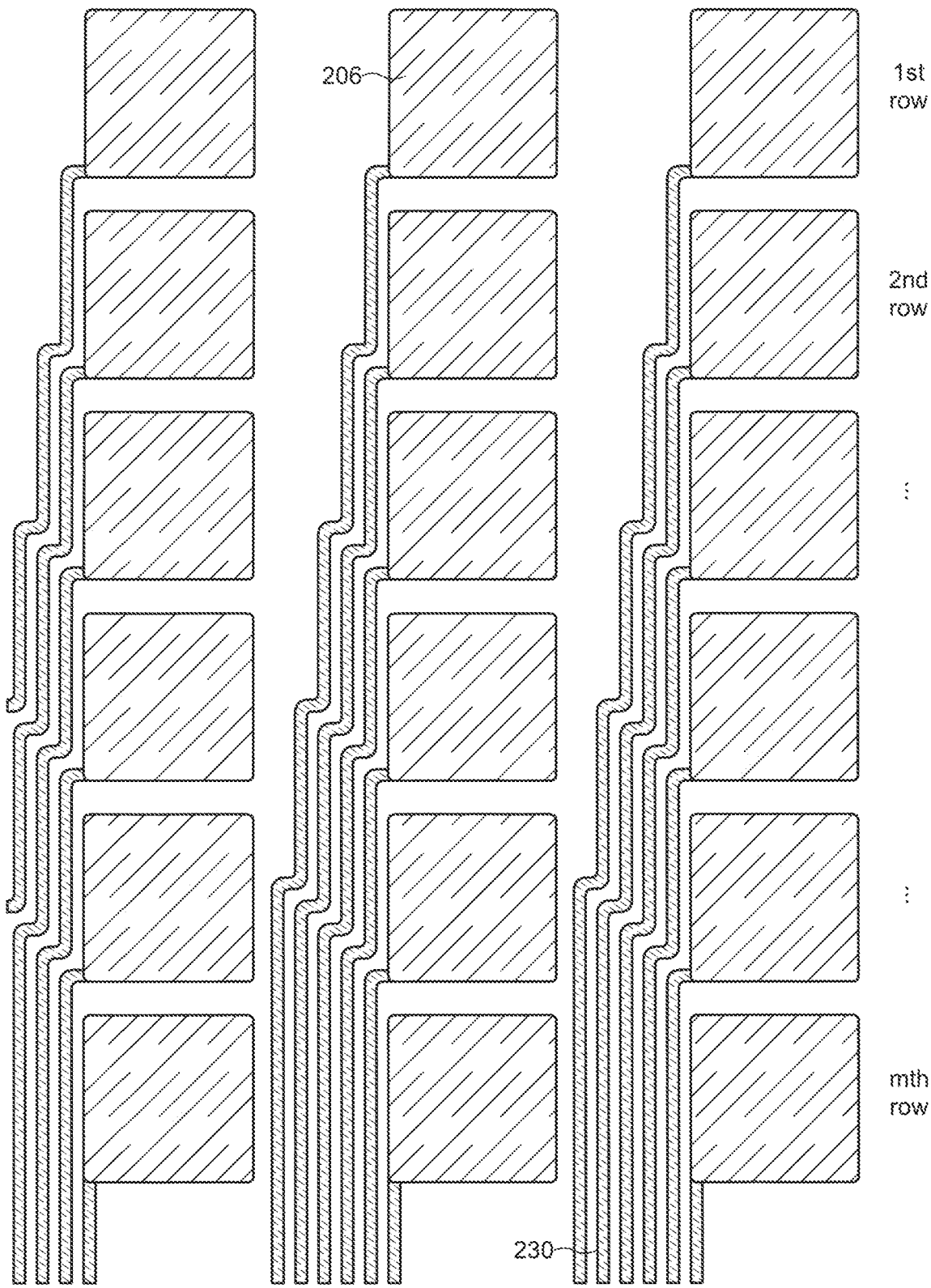
FIG. 19 is a schematic top view of a sensor module according to an embodiment of the present invention.

The configuration of the sensor module 200 of the display device 100 according to an embodiment of the present invention is not limited to the aforementioned configuration. For example, the auxiliary wirings may not be provided as shown in FIG. 19. Since the row dependence of the amount of potential fluctuation caused by the proximity of the input means is reduced by fabricating all of the sensor electrodes with the same area as shown in FIG. 19, the coordinates of the input means can be more accurately identified. Although not illustrated, the sensor module 200 may be configured so that the area of the sensor electrode 206 decreases with increasing row number. Such an arrangement simplifies the layout of the sensor wirings 230 and allows high density arrangement of the sensor wirings 230.

Figure 20:
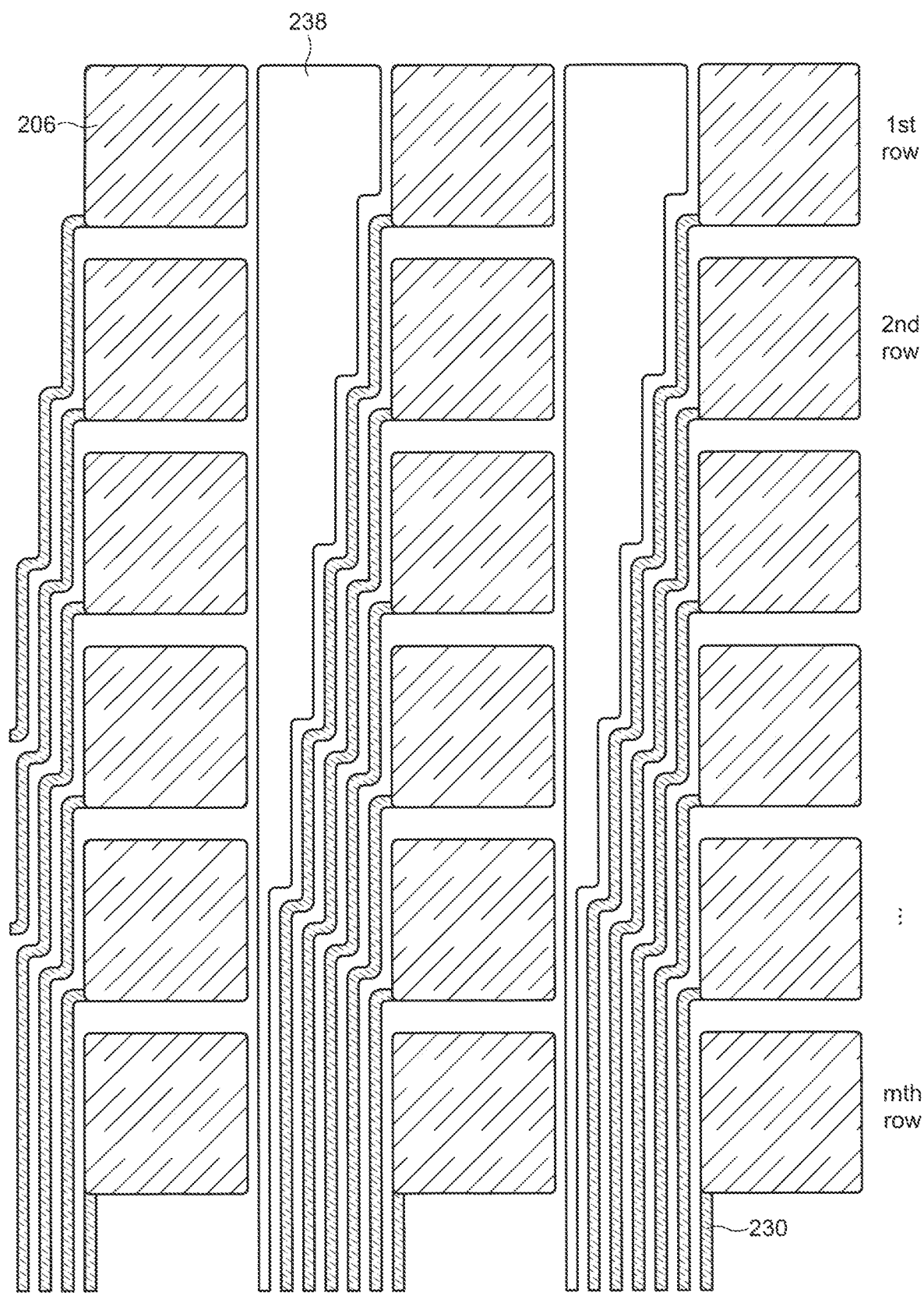
FIG. 20 is a schematic top view of a sensor module according to an embodiment of the present invention.

When no auxiliary wiring is provided, the distance between the sensor wirings 230 connected to the sensor electrodes 206 in one column (e.g., the jth column) and the sensor electrodes 206 in the column adjacent to that column (the (j−1)th column or the (j+1)th column) can be reduced. However, in this case, the sensor wirings 230 are more susceptible to the potential fluctuation of the adjacent column. This influence increases with decreasing row number (i.e., with increasing distance from the terminals 214). For this reason, a shield wiring 238 may be provided between the sensor electrodes 206 located in adjacent rows as shown in FIG. 20. The shield wiring 238 may also include the materials usable in the sensor electrodes 206 and the sensor wirings 230, and preferably includes the same material as the sensor electrodes 206 and sensor wirings 230 and has similar surface morphology. This feature simplifies the manufacturing process and effectively prevents the occurrence of moiré because almost uniform optical characteristics over the entire sensor area 208 can be obtained.

The shield wiring 238 is also connected to the driver circuit 216 and is applied with a pulsed AC voltage in the same phase as the sensor electrodes 206. The influence of the potential fluctuation of the sensor electrodes 206 in the adjacent column on the sensor wirings 230 can be reduced by arranging the shield wiring 238. As a result, the input position can be more accurately identified. Furthermore, the shield wiring 238 may be configured so that its width (i.e., length in the row direction) increases stepwise or continuously as the row number decreases. The electric field between the input means and the sensor area 208 in close proximity becomes uniform without distortion, and the electric field that overlaps the sensor electrodes 206 is detected as a capacitance change by arranging the shield wiring 238 with a variable width in the column direction in this manner. Accordingly, the detection sensitivity of the variation can be maintained regardless of the row.

When no auxiliary wiring is provided, there is no wiring influence caused by the electrostatic capacitance formed between the input means and the auxiliary wiring. Therefore, the aforementioned correction process for the case of j=1 in the first correction process may be applied to all of the sensor electrodes 206 as a correction method in the sensor module 200 without auxiliary wirings.

As described above, in the sensor module 200 and the display device 100 including the sensor module 200 according to an embodiment of the invention, the correction process is performed to reduce or eliminate the wiring influence caused by the formation of the electrostatic capacitance between the input means and the sensor wirings 230 and between the input means and the auxiliary wirings 232. Hence, the input position can be accurately identified. Implementation of the embodiments of the present invention enables the production of a sensor module with high operability and a display device including the same.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention. For example, a configuration, in which the sensor module is retrofit on a computing device equipped with a display portion, may be employed in the sensor module according to an embodiment of the present invention. More specifically, a desktop type computer such as a personal computer (PC) is represented as a computing device, the sensor module may be stacked over a display screen of the computing device, and the driver circuit may be connected to the computing device through the interface.

It is understood that another effect different from that provided by each of the aforementioned embodiments is achieved by the present invention if the effect is obvious from the description in the specification or readily conceived by persons ordinarily skilled in the art.

What is claimed is:

1. A sensor module configured to identify a position of an input means, the sensor module comprising:
   a plurality of sensor electrodes arranged in a matrix form having first to mth rows and first to nth columns;
   a plurality of sensor wirings respectively connected to the plurality of sensor electrodes;
   a plurality of auxiliary wirings respectively connected to the plurality of sensor electrodes and extending from the plurality of sensor electrodes in a direction opposite to a direction in which the plurality of sensor wirings extends from the plurality of sensor electrodes; and
   a driver circuit connected to the plurality of sensor wirings and configured to obtain sensor values of the plurality of sensor electrodes on a basis of fluctuations of the plurality of sensor electrodes,
   wherein at least a part of the plurality of sensor wirings connected to the plurality of sensor electrodes arranged in one of two adjacent columns and at least a part of the plurality of auxiliary wirings connected to the plurality of sensor electrodes arranged in the other column are arranged between the two columns, the driver circuit is configured to:
identify the position of the input means utilizing the sensor values;
perform a correction process including a first correction process and a second correction process to eliminate, in identifying the position of the input means, at least one of an influence of an electrostatic capacitance formed by the input means and a part of the plurality of sensor wirings and an influence of an electrostatic capacitance formed by the input means and a part of the auxiliary wirings;
identify the sensor electrode exhibiting a maximum sensor value as a peak electrode;
judge whether the maximum sensor value exceeds a first threshold value; and
perform at least one of the first correction process and the second correction process when the maximum sensor value exceeds the first threshold value but not to perform the first correction process nor the second correction process when the maximum sensor value is equal to or less than the first threshold value, and m and n are each a constant independently selected from natural numbers equal to or larger than 3.

2. The sensor module according to claim 1,
wherein the first threshold value is selected from a range equal to or more than 50% and equal to or less than 100% of a saturated value of the sensor value.

3. The sensor module according to claim 1,
wherein, when the peak electrode is located in an ith row selected from the first to mth rows and in a jth column selected from the second to nth columns, the driver circuit is configured:
to judge whether the sensor value of the sensor electrode in the ith row and a (j−1)th column exceeds a second threshold value; and
not to perform the first correction process when the sensor value of the sensor electrode in the ith row and the (j−1)th column is judged to be equal to or less than the second threshold value but to perform the first correction process when the sensor value of the sensor electrode in the ith row and the (j−1)th column is judged to exceed the second threshold value, the first correction process includes:
selecting a minimum sensor value from the sensor values of the actually existing sensor electrodes among the sensor electrode in a (i+1)th row and the (j−1)th column to the sensor electrode in the mth row and the (j−1)th column and the sensor electrode in the first row and the jth column to the sensor electrode in a (i−1)th row and the jth column;
when the sensor electrode exhibiting the minimum sensor value is located in the jth column, calculating a value, as a wiring increment, obtained by subtracting, from the minimum sensor value, the sensor value of the sensor electrode in the same row as the sensor electrode exhibiting the minimum sensor value and in the (j−1)th column;
when the sensor electrode exhibiting the minimum sensor value is located in the (j−1)th column, calculating a value, as the wiring increment, obtained by subtracting, from the minimum sensor value, the sensor value of the sensor electrode in the same row as the sensor electrode exhibiting the minimum sensor value and in the jth column;
when the wiring increment is positive, performing a correction to subtract the wiring increment from the senor values of the actually existing sensor electrodes included in the sensor electrode in the (i+1)th row and the (j−1)th column to the sensor electrode in the mth row and the (j−1)th column and the sensor electrode in the first row and the jth column to the sensor electrode in the (i−1)th row and the jth column; and
when the wiring increment is equal to or less than 0, performing no correction on any of the sensor values of the plurality of sensor electrodes, i is a variable selected from natural numbers equal to or more than 1 and equal to or less than m, and
j is a variable selected from natural numbers equal to or more than 1 and equal to or less than n.

4. The sensor module according to claim 3,
wherein the second threshold value is selected from a range equal to or more than 50% and equal to or less than 100% of the sensor value of the peak electrode.

5. The sensor module according to claim 1,
wherein, when the peak electrode is located in an ith row selected from the first to mth rows and in the first column, the driver circuit is configured:
to judge whether i exceeds a first row-threshold value; and
not to perform the first correction process when i is judged to be equal to or less than the first row-threshold value but to perform the first correction process when i is judged to exceed the first row-threshold value, the first correction process includes:
calculating a value, as a wiring increment, obtained by subtracting, from the sensor value of the sensor electrode in the first row and the first column, the sensor value of the sensor electrode in the first row and the second column;
when the wiring increment is positive, performing a correction to subtract the wiring increment on the sensor values of the sensor electrode in the first row and the first column to the sensor electrode in an (i−1)th row and the first column; and
when the wiring increment is equal to or less than 0, performing no correction on any of the sensor values of the plurality of sensor electrodes;

i is a variable selected from natural numbers equal to or more than 1 and equal to or less than m, and
j is a variable selected from natural numbers equal to or more than 1 and equal to or less than n.

6. The sensor module according to claim 5,
wherein the first row-threshold value is selected from a range equal to or more than 50% and equal to or less than 80% of m.

7. The sensor module according to claim 1,
wherein, when the peak electrode is located in an ith row selected from the first to mth rows and in a jth column selected from the first to (n−1)th columns, the driver circuit is configured:
to judge whether the sensor value of the sensor electrode in the ith row and a (j+1)th column exceeds a second threshold; and
not to perform the second correction process when the sensor value of the sensor electrode in the ith row and the (j+1)th column is judged to be equal to or less than the second threshold value but to perform the second correction process when the sensor value of the sensor electrode in the ith row and the (j+1)th column is judged to exceed the second threshold value, the second correction process includes:
- selecting a minimum sensor value from the sensor values of the actually existing sensor electrodes among the sensor electrode in an (i+1)th row and the jth column to the sensor electrode in the mth row and the jth column and the sensor electrode in the first row and the (j+1)th column to the sensor electrode in an (i−1)th row and the (j+1)th column;
- when the sensor electrode exhibiting the minimum sensor value is located in the (j+1)th column, calculating a value, as a wiring increment, obtained by subtracting, from the minimum sensor value, the sensor value of the sensor electrode in the same row as the sensor electrode exhibiting the minimum sensor value and in the jth column;
- when the sensor electrode exhibiting the minimum sensor value is located in the jth column, calculating a value, as the wiring increment, obtained by subtracting, from the minimum sensor value, the sensor value of the sensor electrode in the same row as the sensor electrode exhibiting the minimum sensor value and in the (j+1)th column;
- when the wiring increment is positive, performing a correction to subtract the wiring increment on the sensor values of the actually existing sensor electrodes among the sensor electrode in the first row and (j+1)th column to the sensor electrode in the (i−1)th row and the (j+1)th column and the sensor electrode in the (i+1)th row and the jth column to the sensor electrode in the mth row and the jth column; and
- when the wiring increment is equal to or less than 0, performing no correction on any of the sensor values of the plurality of sensor electrodes, i is a variable selected from natural numbers equal to or more than 1 and equal to or less than m, and j is a variable selected from natural numbers equal to or more than 1 and equal to or less than n.

8. The sensor module according to claim 7,
wherein the second threshold value is selected from a range equal to or more than 50% and equal to or less than 100% of the sensor value of the peak electrode.

9. The sensor module according to claim 1,
wherein, when the peak electrode is located in an ith row selected from the first to mth rows and in the nth column, the driver circuit is configured:
- to judge whether i exceeds the second row-threshold value; and
- not to perform the second correction process when i is judged to exceed the second row-threshold value but to perform the second correction process when i is judged to be equal to or less than the second row-threshold value, the second process includes:
- calculating a value, as a wiring increment, obtained by subtracting, from the sensor value of the sensor electrode in the mth row and the nth column, the sensor value of the sensor electrode in the mth row and a (n−1)th column;
- when the wiring increment is positive, performing a correction to subtract the wiring increment on the sensor values of the sensor electrode in an (i+1)th row and the nth column to the sensor electrode in the mth row and the nth column; and
- when the wiring increment is equal to or less than 0, performing no correction on any of the sensor values of the plurality of sensor electrodes, i is a variable selected from natural numbers equal to or more than 1 and equal to or less than m, and j is a variable selected from natural numbers equal to or more than 1 and equal to or less than n.

10. The sensor module according to claim 9,
wherein the second threshold value is selected from a range equal to or more than 20% and equal to or less than 50% of m.

* * * * *